(12) United States Patent
Zhu et al.

(10) Patent No.: US 12,143,851 B2
(45) Date of Patent: *Nov. 12, 2024

(54) DISTRIBUTED UNIT (DU) MEASUREMENT AND EVENT REPORTING IN DISAGGREGATED BASE STATION

(71) Applicant: QUALCOMM Incorporated, San Diego, CA (US)

(72) Inventors: Xipeng Zhu, San Diego, CA (US); Shankar Krishnan, San Diego, CA (US); Luis Fernando Brisson Lopes, Swindon (GB); Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,567

(22) Filed: Apr. 7, 2023

(65) Prior Publication Data

US 2023/0284068 A1  Sep. 7, 2023

Related U.S. Application Data

(63) Continuation of application No. 17/236,946, filed on Apr. 21, 2021, now Pat. No. 11,653,243.

(Continued)

(51) Int. Cl.
*H04W 72/04* (2023.01)
*H04L 1/1812* (2023.01)
(Continued)

(52) U.S. Cl.
CPC ........... *H04W 24/10* (2013.01); *H04L 1/1819* (2013.01); *H04W 28/04* (2013.01); *H04W 74/0841* (2013.01); *H04W 80/02* (2013.01)

(58) Field of Classification Search
CPC . H04W 24/10; H04W 28/04; H04W 74/0841; H04W 80/02; H04W 88/085; H04L 1/1819; H04L 1/1874
See application file for complete search history.

(56) References Cited

U.S. PATENT DOCUMENTS 10,986,520 B2   4/2021   Nagaraja et al.
2019/0075552 A1  3/2019   Yu et al.
(Continued)

FOREIGN PATENT DOCUMENTS

WO   2018012873 A1   1/2018
WO   2019013996 A1   1/2019
(Continued)

OTHER PUBLICATIONS

CATT (Rapporteur): "Output of Email Discussion [107#45] [Nason] RACH and Mobility Robustness Optimisation Checking", 3GPP TSG-RAN WG2 Meeting #107bis, R2-1912147, Output of Email Discussion [107#45] [Nason] RACH and Mobility Robustness Optimisation Checking, 3rd Generation Partnership Project, Mobile Competence Centre, 650, Route D, vol. RAN WG2, No. Chongqing, P.R.China, Oct. 14, 2019-Oct. 18, 2019, Oct. 3, 2019, XP051803762, 38 Pages, section 2.1.

(Continued)

*Primary Examiner* — Mahbubul Bar Chowdhury
(74) *Attorney, Agent, or Firm* — Guang Yu Zhang; Loza & Loza LLP

(57) ABSTRACT

Aspects relate to measurement and event reporting from a distributed unit (DU) of a disaggregated base station to a central unit (CU) of the disaggregated base station. The CU can configure the DU with a measurement configuration associated with at least one value to be obtained by the DU and a reporting configuration for reporting the at least one value to the CU. The measurement reports can be sent by DU periodically or the measurement reports can be event-
(Continued)

triggered based on the reporting configuration. In addition, the measurement reports can be UE-specific or DU/cell-specific. The measurement reports may include random access channel (RACH) reports, uplink measurement reports, radio link protocol (RLC) reports, medium access control (MAC) protocol reports, and other types of measurement or event-based reports.

27 Claims, 16 Drawing Sheets

Related U.S. Application Data

(60) Provisional application No. 63/013,987, filed on Apr. 22, 2020.

(51) Int. Cl.
*H04W 24/10* (2009.01)
*H04W 28/04* (2009.01)
*H04W 74/0833* (2024.01)
*H04W 80/02* (2009.01)

(56) References Cited

U.S. PATENT DOCUMENTS

| | | |
|---|---|---|
| 2019/0208478 A1 | 7/2019 | Park et al. |
| 2019/0373627 A1 | 12/2019 | Luo et al. |
| 2020/0119864 A1 | 4/2020 | Xu et al. |
| 2020/0162211 A1 | 5/2020 | Wang et al. |
| 2020/0177263 A1 | 6/2020 | Zhang |
| 2021/0112429 A1* | 4/2021 | Raghavan ............ H04B 17/318 |
| 2021/0168755 A1 | 6/2021 | Sirotkin |
| 2021/0274406 A1 | 9/2021 | Ode et al. |
| 2021/0337412 A1 | 10/2021 | Zhu |
| 2022/0022058 A1 | 1/2022 | Fang et al. |
| 2022/0022267 A1 | 1/2022 | Shi et al. |
| 2022/0131793 A1* | 4/2022 | Ramachandra ..... H04W 36/305 |
| 2022/0217781 A1 | 7/2022 | Decarreau et al. |
| 2022/0295571 A1 | 9/2022 | Da Silva et al. |
| 2023/0217368 A1* | 7/2023 | Du .................. H04W 52/0219 370/311 |

FOREIGN PATENT DOCUMENTS

| | | |
|---|---|---|
| WO | 2019241621 A1 | 12/2019 |
| WO | 2021047781 A1 | 3/2021 |

OTHER PUBLICATIONS

Ericsson: "TP for RACH Report Signalling on F1 Interface", 3GPP Draft, 3GPP TSG-RAN3 #107bis-e, R3-202263, 3rd Generation Partnership Project (3GPP), Mobile Competence Centre, 650, Route Des Lucioles, F-06921 Sophia-Antipolis Cedex, France, vol. RAN WG3, No. Online, Apr. 20, 2020-Apr. 30, 2020, Apr. 9, 2020 (Apr. 9, 2020), XP051870675, 125 Pages, p. 1-p. 14.
International Search Report and Written Opinion—PCT/US2021/028576—ISA/EPO—dated Aug. 12, 2021.

* cited by examiner

DISTRIBUTED UNIT (DU) MEASUREMENT AND EVENT REPORTING IN DISAGGREGATED BASE STATION

CROSS-REFERENCE TO RELATED APPLICATIONS

The present application for Patent is a Continuation of pending U.S. Non-Provisional application Ser. No. 17/236,946 filed on Apr. 21, 2021, which claims priority to and benefit of U.S. Provisional Application No. 63/013,987, filed Apr. 22, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to techniques for measurement and event reporting within disaggregated base stations.

INTRODUCTION

In 5G New Radio wireless communication networks, resources may be shared between access networks and backhaul networks. For example, the wireless spectrum may be used for both access links (e.g., links between base stations and user equipment (UEs)) and backhaul links (e.g., links between base stations and the core network). In such integrated access backhaul (IAB) networks, the base station functionality can be logically separated into a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. In an example IAB network architecture, the CU may be implemented at an edge IAB node, while multiple DUs may be distributed throughout the IAB network.

The CU in combination with one or more DUs, which may be co-located and/or distributed, may be referred to as a disaggregated base station. A disaggregated base station may be implemented within an IAB network or within other network configurations. The CU and DU(s) are connected via an F1 interface, which utilizes an F1 application protocol (F1-AP) to convey information between the CU and the DU(s). Enhancements to the F1-AP continue to be developed to support functionalities and features of disaggregated base stations.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of operation at a distributed unit (DU) of a disaggregated base station is disclosed. The method includes receiving a measurement request from a central unit (CU) of the disaggregated base station. The measurement request includes a measurement configuration associated with at least one value to be obtained by the DU and a reporting configuration for reporting the at least one value to the CU. The method further includes obtaining the at least one value in accordance with the measurement configuration at the DU and sending a measurement report associated with the at least one value from the DU to the CU in accordance with the reporting configuration.

Another example provides a disaggregated base station within a wireless communication network. The disaggregated base station includes a transceiver, a memory, and a processor communicatively coupled to the transceiver and the memory. The processor and the memory can be configured to receive a measurement request from a central unit (CU) of the disaggregated base station at a distributed unit (DU) of the disaggregated base station. The measurement request includes a measurement configuration associated with at least one value to be obtained by the DU and a reporting configuration for reporting the at least one value to the CU. The processor and the memory can further be configured to obtain the at least one value in accordance with the measurement configuration at the DU and send a measurement report associated with the at least one value from the DU to the CU in accordance with the reporting configuration.

Another example provides a disaggregated base station within a wireless communication network. The disaggregated base station includes means for receiving a measurement request from a central unit (CU) of the disaggregated base station at a distributed unit (DU) of the disaggregated base station. The measurement request includes a measurement configuration associated with at least one value to be obtained by the DU and a reporting configuration for reporting the at least one value to the CU. The disaggregated base station further includes means for obtaining the at least one value in accordance with the measurement configuration at the DU and means for sending a measurement report associated with the at least one value from the DU to the CU in accordance with the reporting configuration.

Another example provides a non-transitory computer-readable medium having stored therein instructions executable by one or more processors of a disaggregated base station to receive a measurement request from a central unit (CU) of the disaggregated base station at a distributed unit (DU) of the disaggregated base station. The measurement request includes a measurement configuration associated with at least one value to be obtained by the DU and a reporting configuration for reporting the at least one value to the CU. The non-transitory computer-readable medium further includes instructions executable by one or more processors of the disaggregated base station to obtain the at least one value in accordance with the measurement configuration at the DU and send a measurement report associated with the at least one value from the DU to the CU in accordance with the reporting configuration.

In another example, a method of operation at a central unit (CU) of a disaggregated base station is disclosed. The method includes sending a measurement request to a distributed unit (DU) of the disaggregated base station. The measurement request includes a measurement configuration associated with at least one value to be obtained by the DU and a reporting configuration for reporting the at least one value to the CU. The method further includes receiving a measurement response from the DU confirming configuration of the DU in accordance with the measurement configuration and the reporting configuration and receiving a measurement report associated with the at least one value from the DU in accordance with the reporting configuration.

Another example provides a disaggregated base station within a wireless communication network. The disaggregated base station includes a transceiver, a memory, and a processor communicatively coupled to the transceiver and the memory. The processor and the memory can be configured to, at a central unit (CU) of the disaggregated base station, sending a measurement request to a distributed unit (DU) of the disaggregated base station. The measurement request includes a measurement configuration associated with at least one value to be obtained by the DU and a reporting configuration for reporting the at least one value to the CU. The processor and the memory can further be configured to receive a measurement response from the DU confirming configuration of the DU in accordance with the measurement configuration and the reporting configuration and receive a measurement report associated with the at least one value from the DU in accordance with the reporting configuration.

Another example provides a central unit (CU) of a disaggregated base station within a wireless communication network. The CU of the disaggregated base station includes means for sending a measurement request to a distributed unit (DU) of the disaggregated base station. The measurement request includes a measurement configuration associated with at least one value to be obtained by the DU and a reporting configuration for reporting the at least one value to the CU. The CU of the disaggregated base station further includes means for receiving a measurement response from the DU confirming configuration of the DU in accordance with the measurement configuration and the reporting configuration and means for receiving a measurement report associated with the at least one value from the DU in accordance with the reporting configuration.

Another example provides a non-transitory computer-readable medium having stored therein instructions executable by one or more processors of a central unit (CU) of a disaggregated base station to send a measurement request to a distributed unit (DU) of the disaggregated base station. The measurement request includes a measurement configuration associated with at least one value to be obtained by the DU and a reporting configuration for reporting the at least one value to the CU. The non-transitory computer-readable medium further includes instructions executable by one or more processors of the CU of the disaggregated base station to receive a measurement response from the DU confirming configuration of the DU in accordance with the measurement configuration and the reporting configuration and receive a measurement report associated with the at least one value from the DU in accordance with the reporting configuration.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
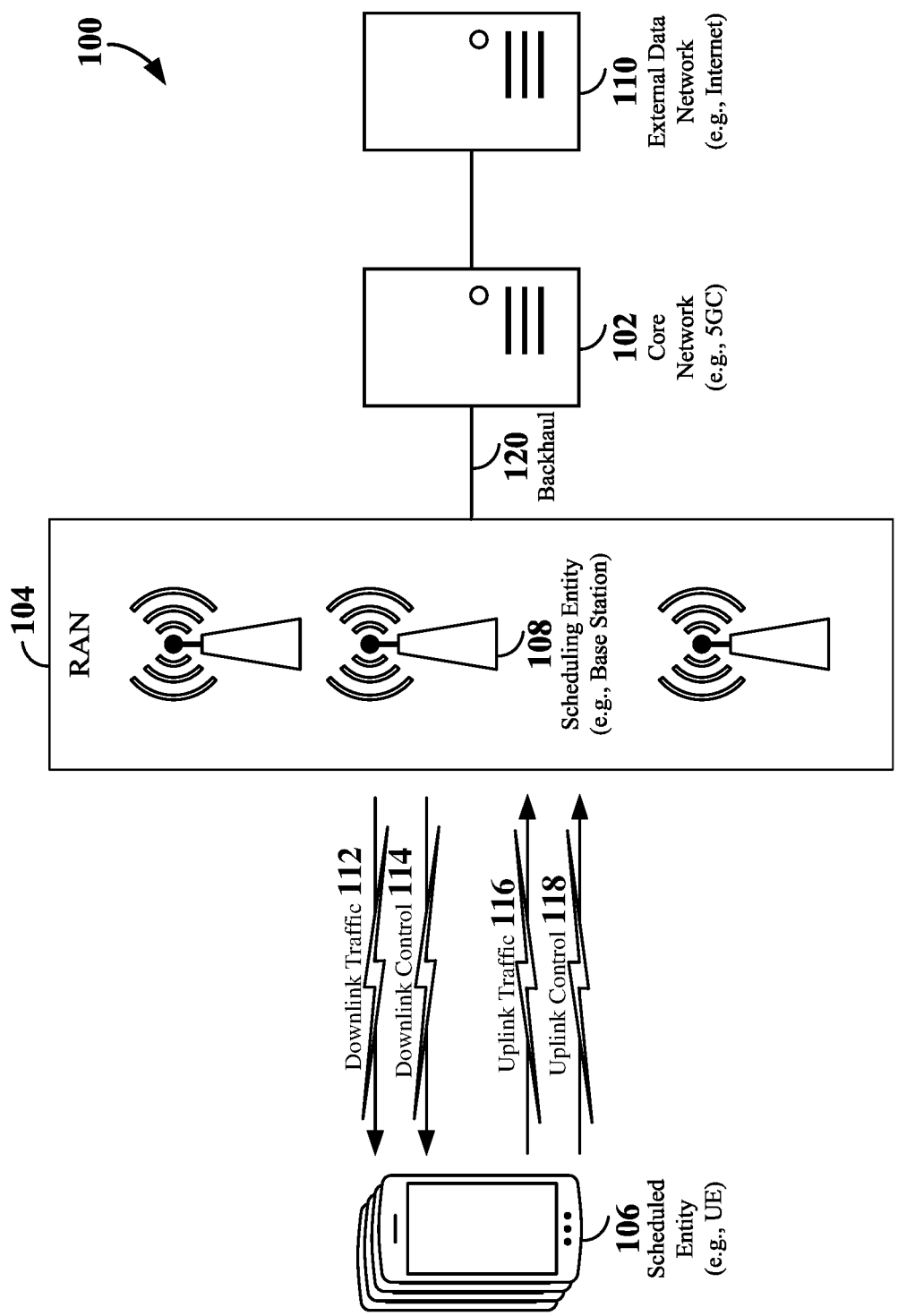
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to measurement and event reporting from a distributed unit (DU) of a disaggregated base station to a central unit (CU) of the disaggregated base station. The CU can configure the DU with a measurement configuration associated with at least one value to be obtained by the DU and a reporting configuration for reporting the at least one value to the CU. The measurement reports can be sent by the DU periodically or the measurement reports can be event-triggered based on the reporting configuration. In addition, the measurement reports can be UE-specific or DU/cell-specific. For UE-specific measurement reports, the UE identifier (ID) may be included in the measurement configuration and the measurement report.

The measurement configuration can include one or more of a parameter associated with the at least one value, a measurement period for the at least one value, or a filtering configuration for filtering the at least one value. The reporting configuration can indicate the selected parameter(s) associated with the at least one value to include in the measurement report. In addition, for event-based reporting, the reporting configuration can further include one or more thresholds associated with the event. The threshold(s) may be used by the DU to determine when to transmit the measurement report.

The values included in the measurement reports can include random access channel (RACH) report values, uplink measurements, radio link protocol (RLC) measurements, medium access control (MAC) protocol measurements, or other values associated with other types of measurements or events. For RACH reports, the parameter(s) may include at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size. In addition, for uplink measurements, the parameter(s) may include at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report. Furthermore, for RLC measurements, the parameter(s) may include at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator. For MAC protocol measurements, the parameter(s) may include at least a beam failure recovery statistic. Other types of values may include, for example, the DU load, a remote interference measurement detected indicator or a strong uplink interference measurement detected indicator.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
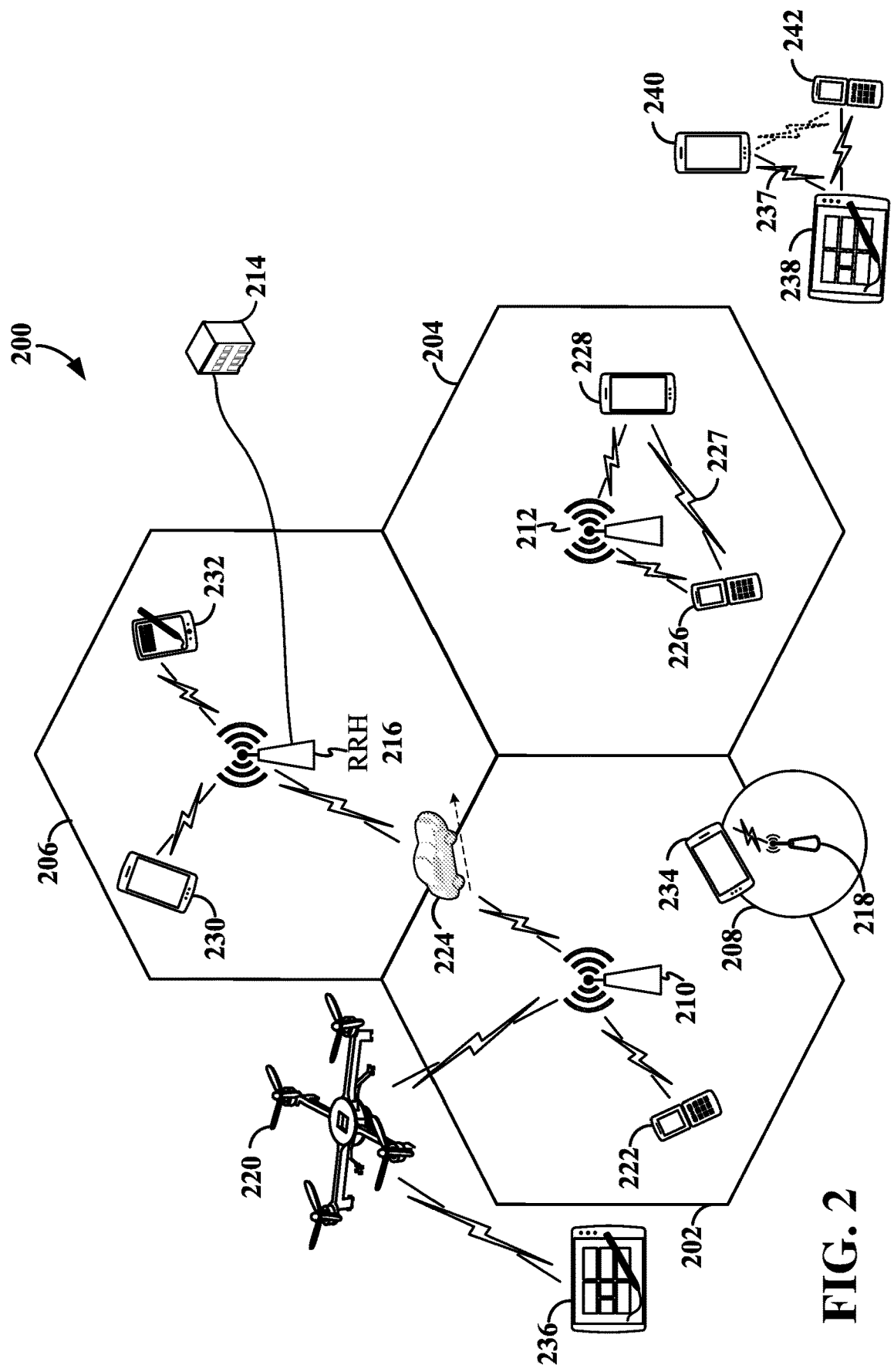
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
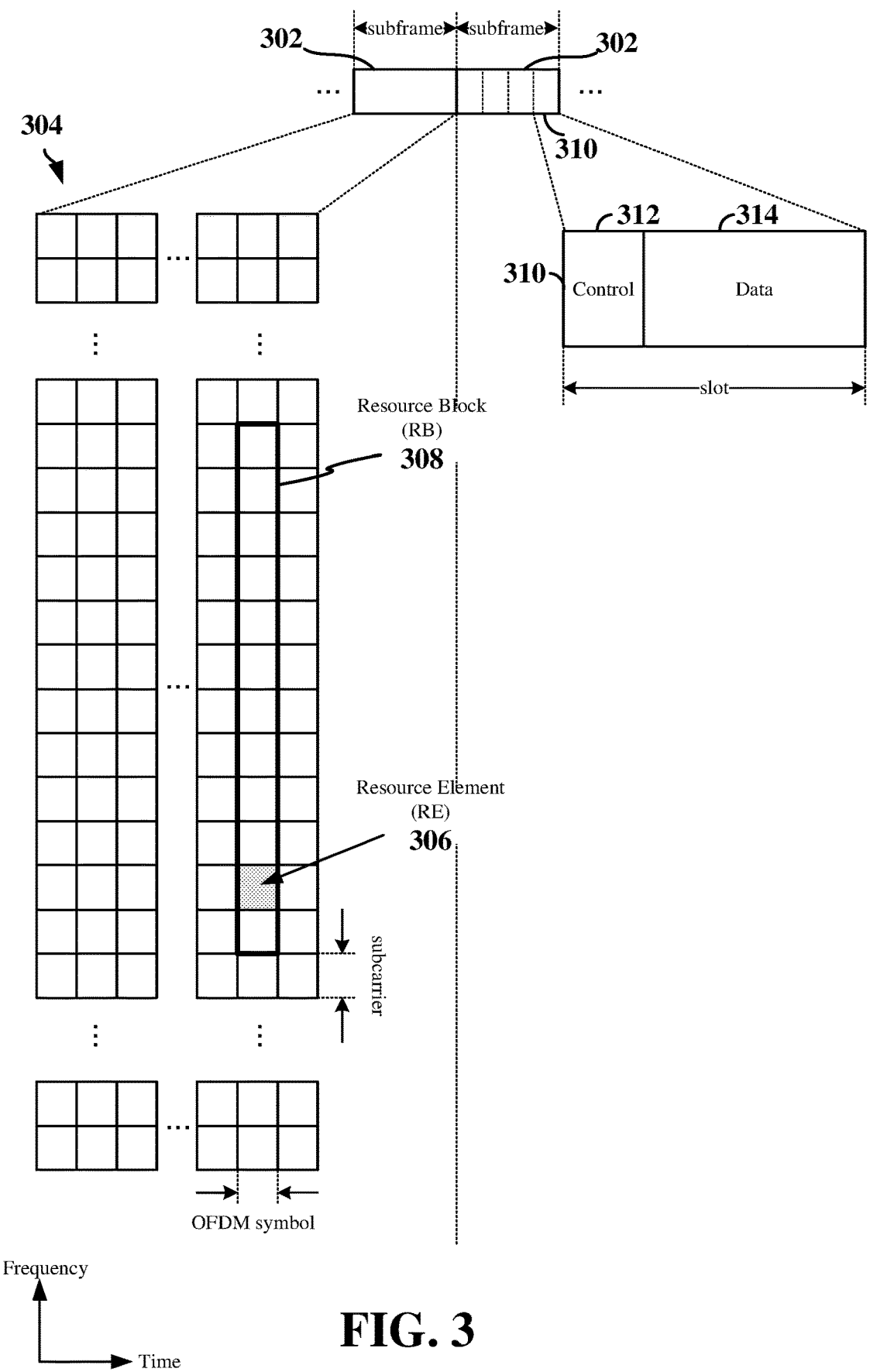
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSB s may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIB s and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
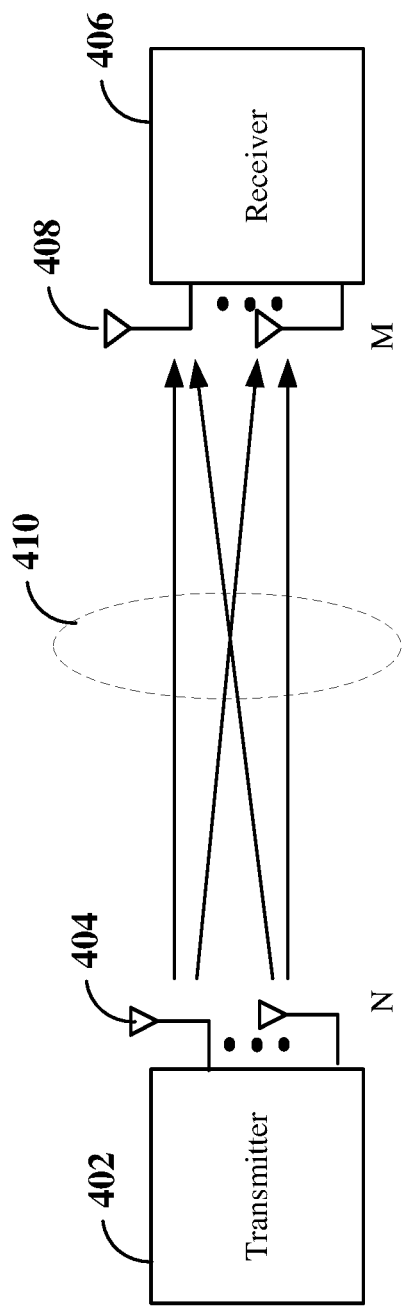
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner. The UE may measure the reference signal received power (RSRP), reference signal received quality (RSRQ) or SINR on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In order to gain access to a cell, a UE may perform a random access procedure over a physical random access channel (PRACH). The UE may identify a random access search space including PRACH resources for initiating a RACH procedure from the SIB1. For example, a random access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

Figure 5:
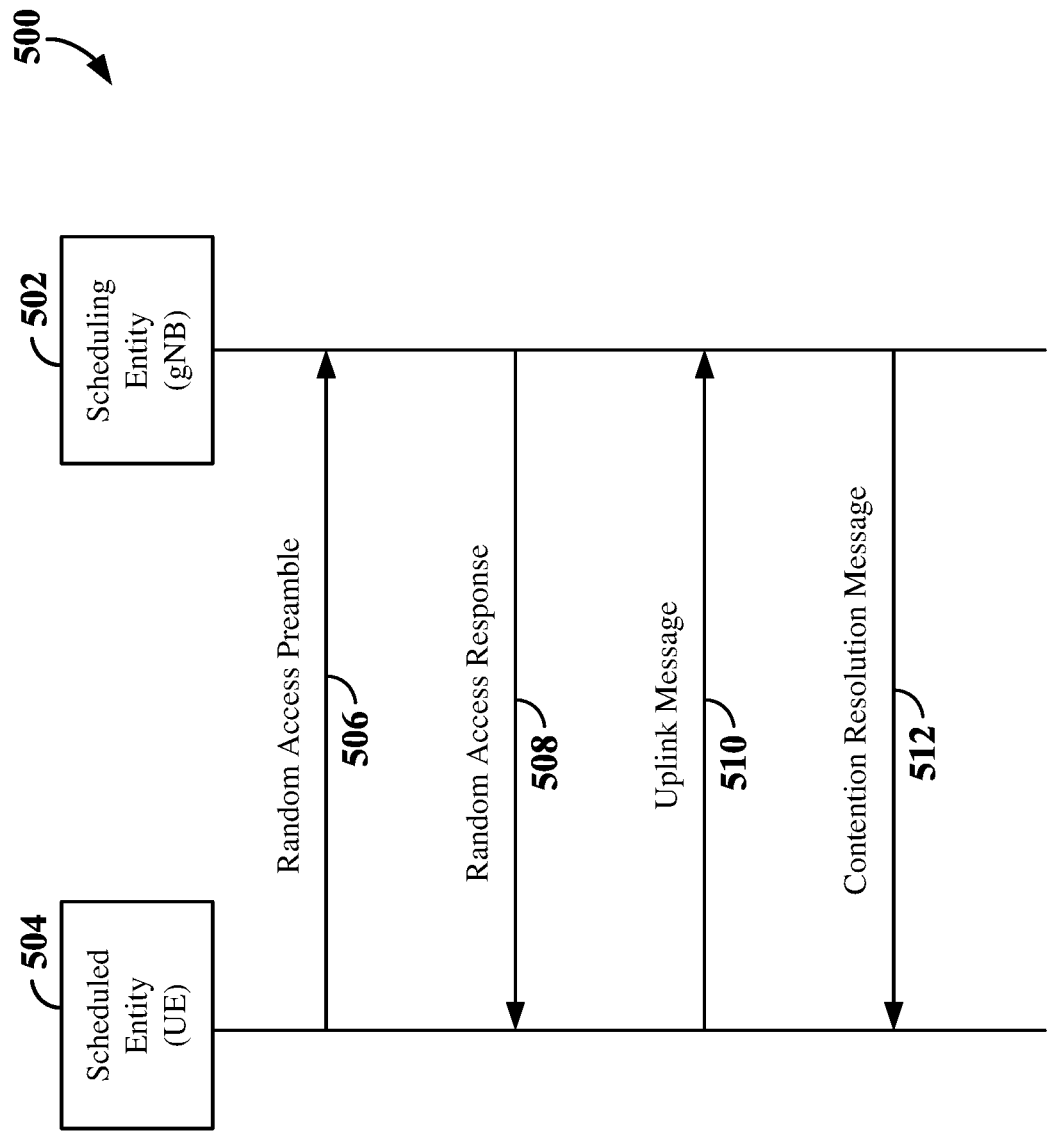
FIG. 5 is a diagram illustrating an example of a contention based random access procedure utilizing a random access channel (RACH) according to some aspects.

FIG. 5 is a diagram illustrating an example of a 4-step contention-based random access (CBRA) procedure 500 between a base station 502 and a UE 504. The base station 502 may correspond, for example, to any of the scheduling entities shown in FIGS. 1 and/or 2. In addition, the UE 504 may correspond, for example, to any of the scheduled entities shown in FIGS. 1 and/or 2.

The random access procedure 500 shown in FIG. 5 is initiated by the UE 504 randomly selecting a preamble from an available set of preambles within the cell served by the base station 502, and transmitting the selected preamble to the base station 502 in a RACH preamble message 506

(msg1). In an example, the UE 504 may select from 64 possible preamble sequences for inclusion in the RACH preamble message 506. The msg1 506 may be transmitted by the UE 504 over a selected PRACH resource with power ramping. The selected PRACH resource may include supplementary uplink resources or normal uplink resources. Here, supplementary uplink resources include lower frequency resources than normal uplink resources. Thus, supplementary uplink resources and uplink resources each correspond to a different respective uplink frequency band. The msg1 506 may further be communicated on a beam selected by the UE 504 based on beam measurements (e.g., RSRP/RSRQ/SINR) performed by the UE 504. The beam may correspond, for example, to an SSB beam.

If the preamble is successfully detected by the base station 502, the base station 502 transmits a random access response (RAR) message 508 (msg2) including a PDCCH and PDSCH to the UE 504. If no msg2 (RAR) 508 is received within a RAR window, the UE 504 may retransmit msg1 506 with power boost. The msg2 508 (PDCCH+PDSCH) includes an identifier of the preamble sent by the UE 504, a Timing Advance (TA), a temporary cell radio network temporary identifier (TC-RNTI) or random access (RA) RNTI for the UE 504 and a grant of assigned uplink (UL) resources. The PDCCH in msg2 508 may be scrambled with the RA-RNTI, which is a function of a RACH occasion (RO) (e.g., time-frequency resources allocated for RACH msg1) that the UE 504 used to send msg1 506. A medium access control-control element (MAC-CE) within the PDSCH provides an acknowledgement of the reception of msg1 and the UL grant. To receive msg2 508, the UE 504 may monitor DCI 1_0 for the PDCCH scrambled with the RA-RNTI corresponding to the RO used by the UE 504 to transmit msg1 506, and if detected, proceeds with PDSCH decoding. Upon receipt of the RAR message 508, the UE 504 compares the preamble ID to the preamble sent by the scheduled entity in the RACH preamble message 506. If the preamble ID matches the preamble sent in the RACH preamble message 506, the UE 504 applies the timing advance and starts a contention resolution procedure.

Since the preamble is selected randomly by the scheduled entity, if another scheduled entity selects the same preamble in the same RO, a collision may result between the two scheduled entities. Any collisions may then be resolved using the contention resolution procedure. During contention resolution, the UE 504 transmits an uplink message (msg3) 510 on the common control channel (CCCH) using the TA and assigned uplink resources in the PDSCH of msg2 508. In an example, the uplink message 510 is a Layer 2/Layer 3 (L2/L3) message, such as a Radio Resource Control (RRC) Connection Request message. The uplink message 510 includes an identifier of the UE 504 (UE-ID) for use by the scheduling entity in resolving any collisions. Although other scheduled entities may transmit colliding uplink messages utilizing the TA and assigned uplink resources, these colliding uplink messages will likely not be successfully decoded at the scheduling entity since the colliding uplink messages were transmitted with TAs that were not intended for those scheduled entities.

Upon successfully decoding the uplink message, the base station 502 transmits a contention resolution message 512 to the UE 504 (msg4). The contention resolution message 512 may be, for example, an RRC-Connection Setup message. In addition, the contention resolution message 512 includes the identifier of the UE 504 that was received in the uplink message 510. The UE 504, upon receiving its own identity back in the contention resolution message 512, concludes that the random access procedure was successful and completes the RRC connection setup process. Any other scheduled entity receiving the RRC-Connection Setup message with the identity of the UE 504 will conclude that the random access procedure failed and re-initialize the random access procedure.

Figure 6:
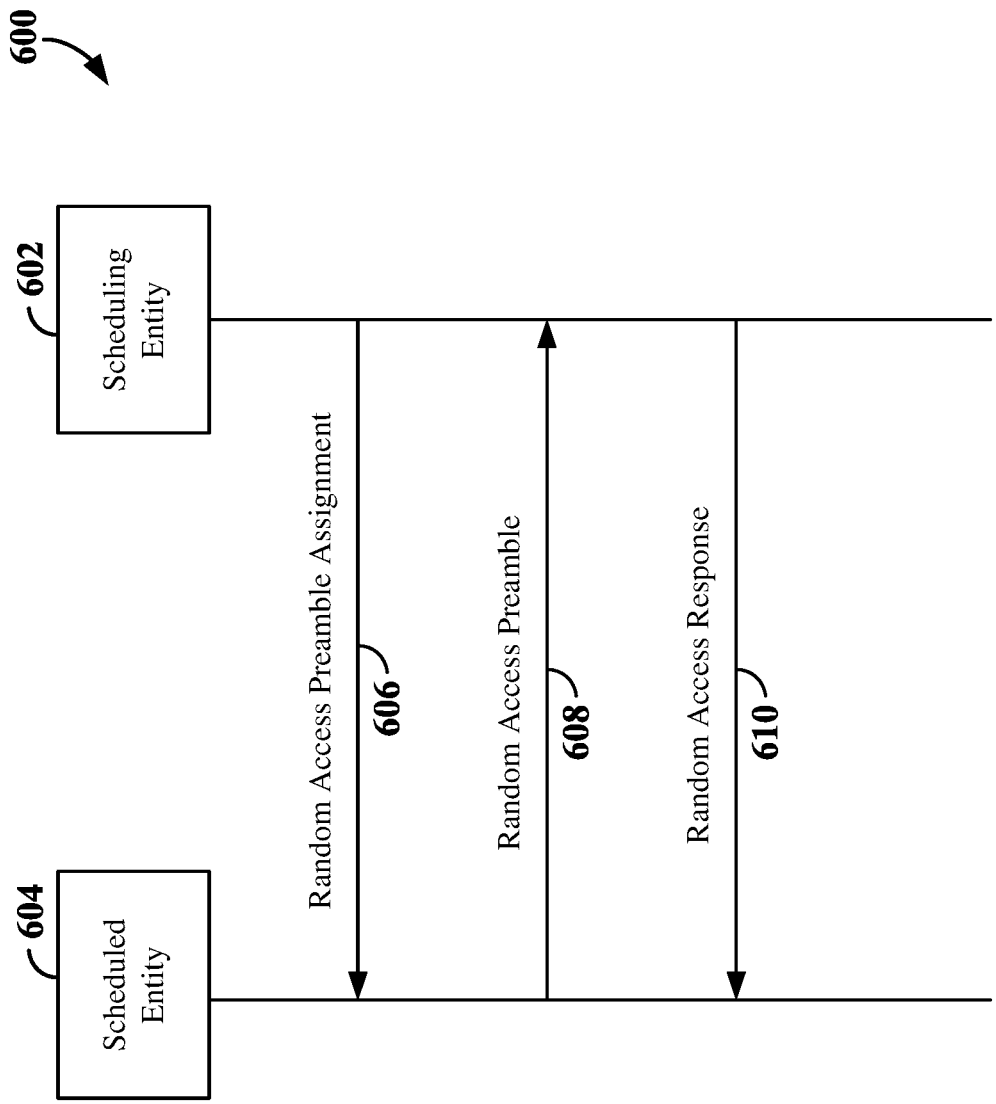
FIG. 6 is a diagram illustrating an example of a non-contention based random access procedure utilizing the RACH according to some aspects.

FIG. 6 is a diagram illustrating an example of a contention-free random access (CFRA) procedure 600 between a base station 602 and a UE 604. The base station 602 may correspond, for example, to any of the scheduling entities shown in FIGS. 1 and/or 2. In addition, the UE 604 may correspond, for example, to any of the scheduled entities shown in FIGS. 1 and/or 2.

The CFRA procedure 600 may be used, for example, during handovers, after uplink synchronization loss or positioning of the scheduled entity. The CFRA procedure is initiated by the base station 602 selecting a preamble from a reserved set of preambles within the cell served by the base station 602, and transmitting the selected preamble to the UE 604 in a RACH preamble assignment message 606. In an example, the reserved set of preambles may be separate from the pool of preambles available for random selection in contention based random access. Thus, the reserved set of preambles may be assigned by the scheduling entity in a contention-free manner to avoid PRACH collisions.

The UE 604 may then transmit the assigned preamble to the base station 602 in a RACH preamble message 608 on a selected PRACH resource within SUL or normal UL resources and selected beam. The base station 602 may then transmit a random access response (RAR) message 610 on the physical downlink control channel (PDCCH). The RAR message 610 includes an identifier of the preamble sent by the UE 604, a Timing Advance (TA), a temporary cell radio network temporary identifier (TC-RNTI) or random access (RA) RNTI for the UE 604 and a grant of assigned uplink resources. Upon receipt of the RAR message 610, the UE 604 applies the timing advance and may initiate an uplink transmission 612 using the assigned uplink resources.

Figure 7:
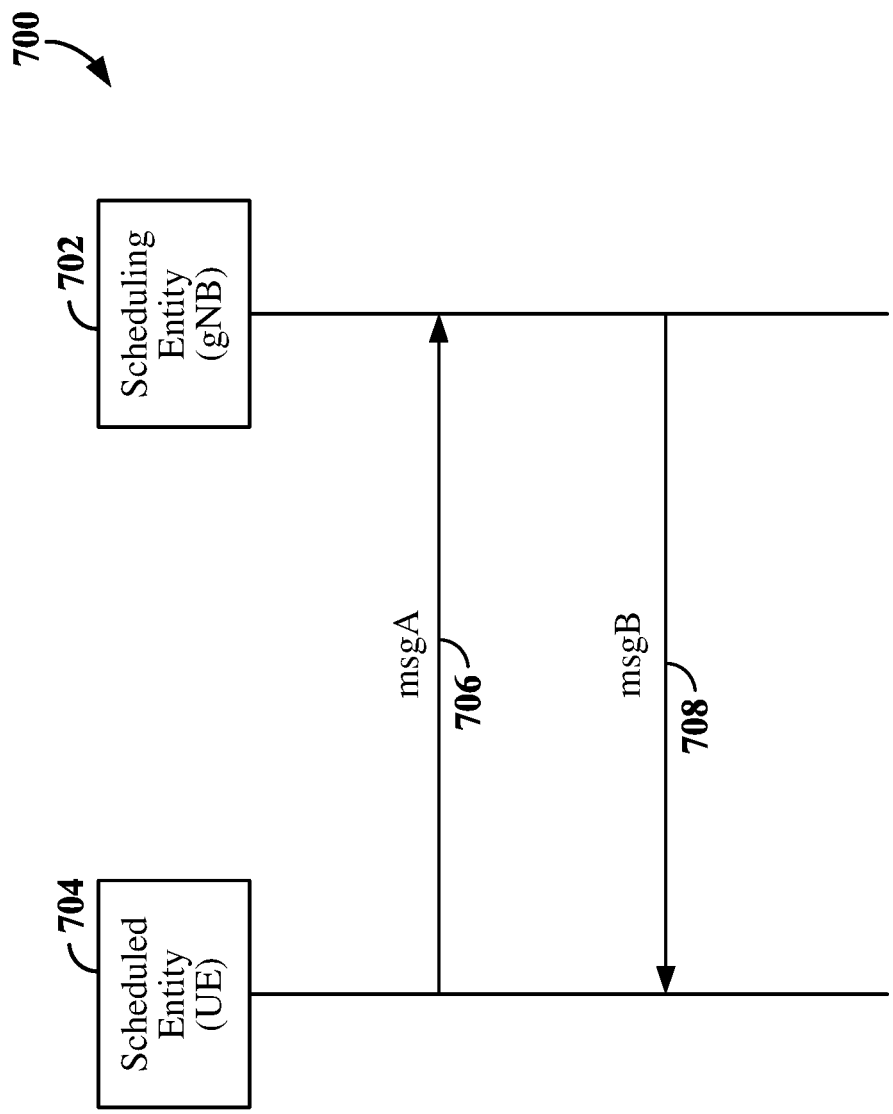
FIG. 7 is a diagram illustrating an example two-step RACH procedure according to some aspects.

The four-step CBRA procedure 500 or the three-step CFRA procedure 600 can be compressed into the two-step random-access procedure 700 illustrated in FIG. 7. The two-step random-access procedure 700 reduces overhead and latency associated with control signaling by removing a transmission in each direction between the UE 704 and base station or scheduling entity, such as the illustrated gNB 702. In comparison to FIG. 5, the two-step random-access procedure 700 commences with a transmission by the UE 704 of a single message (msgA 706) that includes the RACH preamble message 506 and uplink message 510 sent of the contention-based random-access procedure 500. Here, the uplink message 510 may be a scheduled PUSCH transmission sent over a PUSCH resource and the RACH preamble message 506 may be sent over a selected PRACH resource. The gNB 702 responds with a single message (msgB 708) that includes the random-access response 508 and the contention resolution message 512.

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 8.

Figure 8:
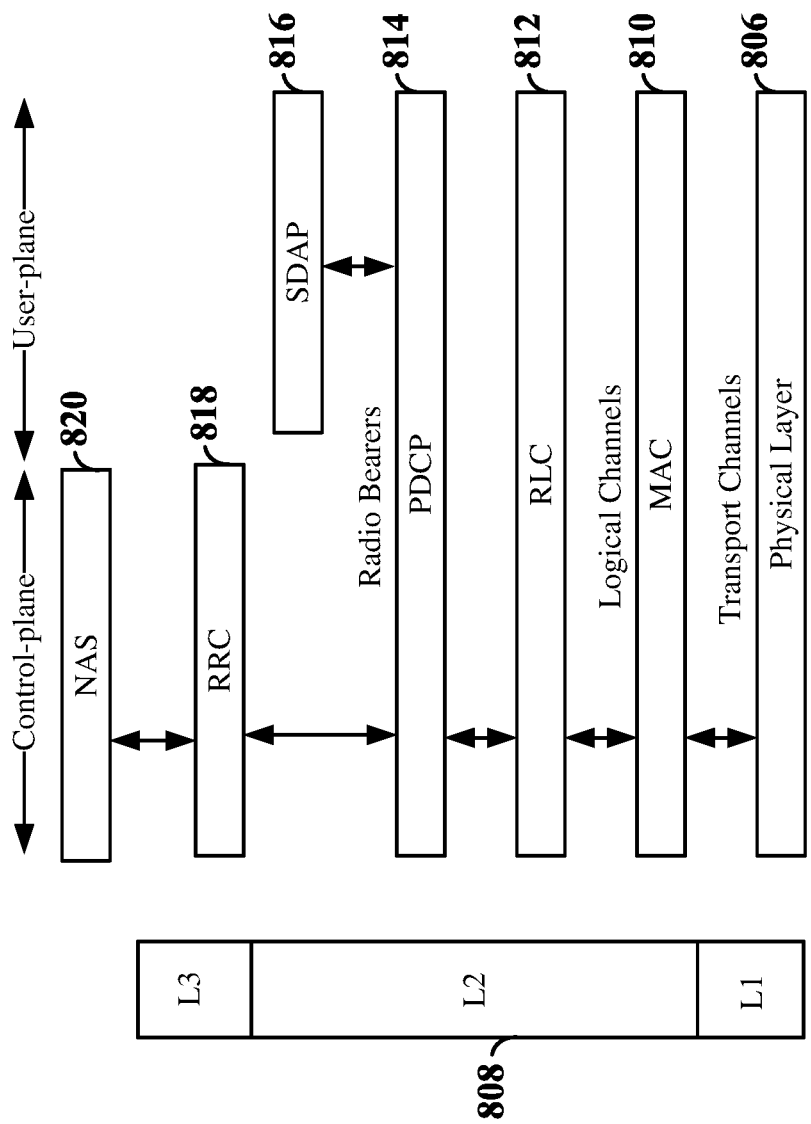
FIG. 8 is a diagram illustrating an example of a radio protocol architecture for the user and control plane according to some aspects.

As illustrated in FIG. 8, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer

806. L2 808 is above the physical layer 806 and is responsible for the link between the UE and base station over the physical layer 806.

In the user plane, the L2 layer 808 includes a media access control (MAC) layer 810, a radio link control (RLC) layer 812, a packet data convergence protocol (PDCP) 814 layer, and a service data adaptation protocol (SDAP) layer 816, which are terminated at the base station on the network side. Although not shown, the UE may have several upper layers above the L2 layer 808 including at least one network layer (e.g., IP layer and user data protocol (UDP) layer) that is terminated at the User Plane Function (UPF) on the network side and one or more application layers.

The SDAP layer 816 provides a mapping between a 5G core (5GC) quality of service (QoS) flow and a data radio bearer and performs QoS flow ID marking in both downlink and uplink packets. The PDCP layer 814 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 814 also provides header compression for upper layer data packets to reduce radio transmission overhead, security by ciphering the data packets, and integrity protection of data packets. A PDCP context may indicate whether PDCP duplication is utilized for a unicast connection.

The RLC layer 812 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 812. The MAC layer 810 provides multiplexing between logical and transport channels. The MAC layer 810 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 806 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 806 and L2 808 with the exception that there is no SDAP layer in the control plane and there is no header compression function for the control plane. The control plane also includes a radio resource control (RRC) layer 818 in L3 and a higher Non-Access Stratum (NAS) layer 820. The RRC layer 818 is responsible for establishing and configuring signaling radio bearers (SRBs) and data radio bearers (DRBs) between the base station and the UE, paging initiated by the 5GC or NG-RAN, and broadcast of system information related to Access Stratum (AS) and Non-Access Stratum (NAS). The RRC layer 818 is further responsible for QoS management, mobility management (e.g., handover, cell selection, inter-RAT mobility), UE measurement and reporting, and security functions. The NAS layer 820 is terminated at the AMF in the core network and performs various functions, such as authentication, registration management, and connection management.

In 5G NR networks, a base station may be an aggregated base station, in which the radio protocol stack is logically integrated within a single RAN node, or a disaggregated base station, in which the radio protocol stack is logically split between a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. The CU may be implemented within an edge RAN node, while the one or more DUs may be co-located with the CU and/or distributed throughout multiple RAN nodes that may be physically separated from one another. Disaggregated base stations may be utilized, for example, in integrated access backhaul (TAB) networks.

Figure 9:
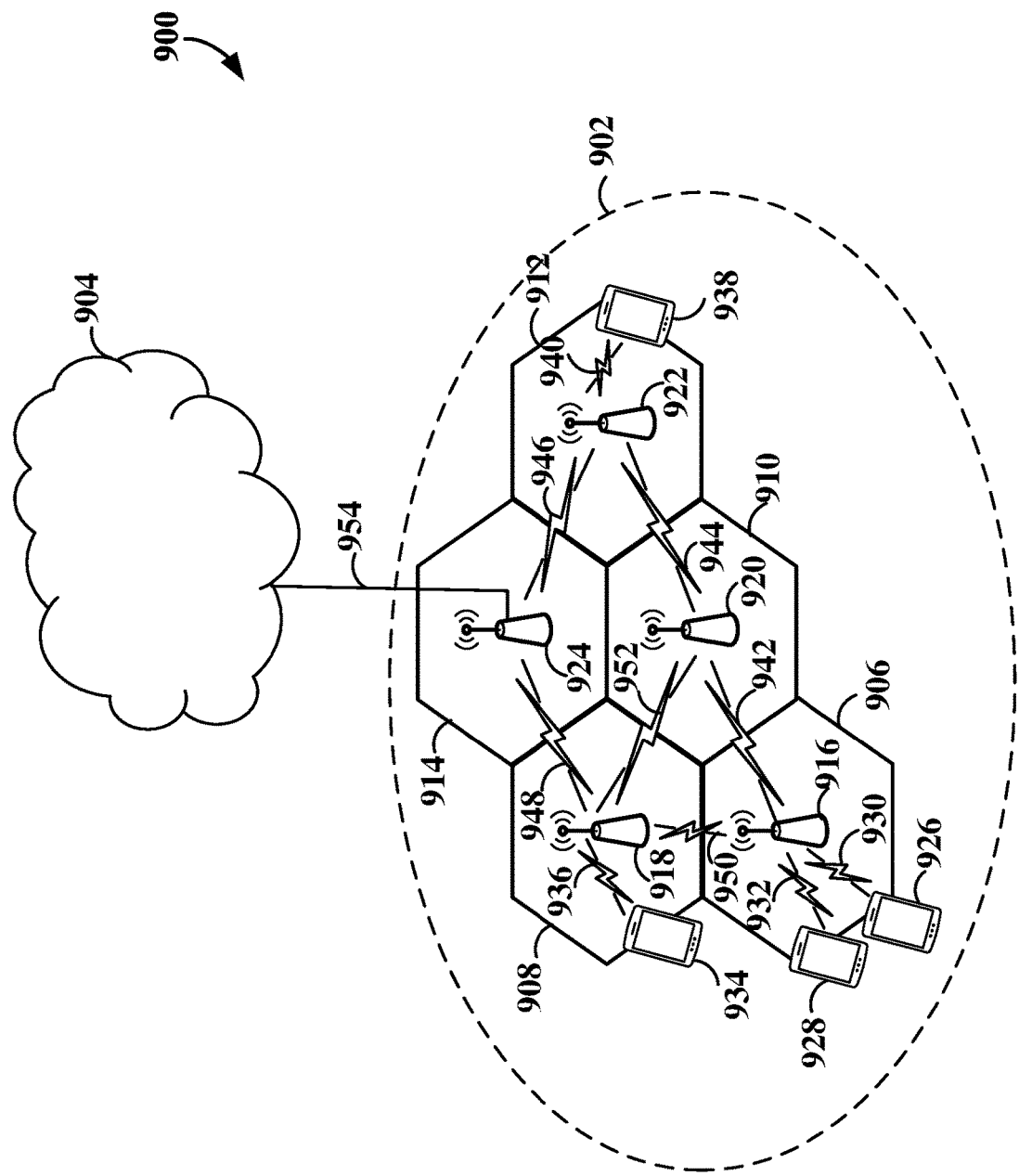
FIG. 9 is a diagram providing a high-level illustration of one example of a network configuration including an integrated access backhaul (IAB) network according to some aspects.

FIG. 9 is a schematic diagram providing a high-level illustration of one example of an IAB network configuration 900 according to some aspects. In this illustration, a communication network 902, such as an IAB network, is coupled to a remote network 904, such as a main backhaul network or mobile core network. In such an IAB network 902, the wireless spectrum may be used for both access links and backhaul links. In some examples, the wireless spectrum may utilize millimeter-wave (mmWave) or sub-6 GHz carrier frequencies.

The IAB network 902 may be similar to the radio access network 200 shown in FIG. 2, in that the IAB network 902 may be divided into a number cells 906, 908, 910, 912, and 914, each of which may be served by a respective IAB node 916, 918, 920, 922, and 924. Each of the IAB nodes 916-924 may be a base station (e.g., a gNB), or other node that utilizes wireless spectrum (e.g., the radio frequency (RF) spectrum) to support access for one or more UEs located within the cells 906-914 served by the IAB nodes.

In the example shown in FIG. 9, IAB node 916 communicates with UEs 926 and 928 via wireless access links 930 and 932, IAB node 918 communicates with UE 934 via wireless access link 936, and IAB node 922 communicates with UE 938 via wireless access link 940. The IAB nodes 916-924 are further interconnected via one or more wireless backhaul links 942, 944, 946, 948, 950, and 952. Each of the wireless backhaul links 942-952 may utilize the same wireless spectrum (e.g., the radio frequency (RF) spectrum) as the access links 930-940 to backhaul access traffic to/from the remote network 904. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any number of IAB nodes to form the IAB network 902.

In the example shown in FIG. 9, IAB node 916 communicates with IAB node 920 via wireless backhaul link 942, IAB node 920 communicates with IAB node 922 via wireless backhaul link 944, IAB node 922 communicates with IAB node 924 via wireless backhaul link 946, IAB node 924 communicates with IAB node 918 via wireless backhaul link 948, IAB node 918 communicates with IAB node 916 via wireless backhaul link 950, and IAB node 918 communicates with IAB node 920 via wireless backhaul link 952. As shown in FIG. 9, each IAB node 916-924 may be connected via respective wireless backhaul links 942-952 to two or more other IAB nodes for robustness.

Some or all of the IAB nodes 916-924 may also be connected via wired backhaul links (e.g., fiber, coaxial cable, Ethernet, copper wires, etc.) and/or microwave backhaul links. Thus, the IAB network 902 may support both wired/microwave and wireless backhaul traffic. At least one of the IAB nodes (e.g., IAB node 924) may be a border IAB node, also referred to herein as an IAB donor node, that also provides a communication link 954 to the remote network 904. For example, the IAB donor node 924 may include a wired (e.g., fiber, coaxial cable, Ethernet, copper wires), microwave, or other suitable link 954 to the remote network 904.

To facilitate wireless communication between the IAB nodes 916-924 and between the IAB nodes 916-924 and the UEs served by the IAB nodes 916-924, each IAB node 916-924 may be configured to operate as both a scheduling entity and a scheduled entity. Thus, an IAB node (e.g., IAB node 916) may utilize the same wireless spectrum to transmit access traffic to/from UEs and to then backhaul that access traffic to/from the remote network 904. For example, to backhaul access traffic to/from IAB node 918, IAB node 918 may communicate with IAB node 920 to transmit backhaul access traffic via wireless backhaul link 942, IAB node 920 may communicate with IAB node 922 to transmit the backhaul access traffic via wireless backhaul link 944, and IAB node 922 may communicate with IAB node 924 to transmit the backhaul access traffic via wireless backhaul link 946. In this example, IAB nodes 920 and 922 may each operate as both a scheduling entity and a scheduled entity to backhaul access traffic to/from IAB node 916. As such, communication between a pair of IAB nodes may be individually scheduled by one of the IAB nodes within the pair.

In other examples, an IAB node may schedule wireless backhaul communications between other pairs of IAB nodes. For example, IAB node 924 may operate as the scheduling entity for the IAB network 902, while IAB nodes 916, 920, and 922 each operate as a scheduled entity to backhaul access traffic to/from IAB node 916. In this example, IAB node 924 may schedule wireless backhaul communications between each of the pairs of IAB nodes (e.g., between IAB node 916 and IAB node 920, between IAB node 920 and IAB node 922, and between IAB node 922 and IAB node 924). As another example, IAB node 922 may operate as a scheduling entity to schedule wireless backhaul communications between IAB nodes 916 and 920 and also between IAB node 920 and IAB node 922. IAB node 922 may then operate as a scheduled entity to allow IAB node 924 to schedule wireless backhaul communications therebetween.

Figure 10:
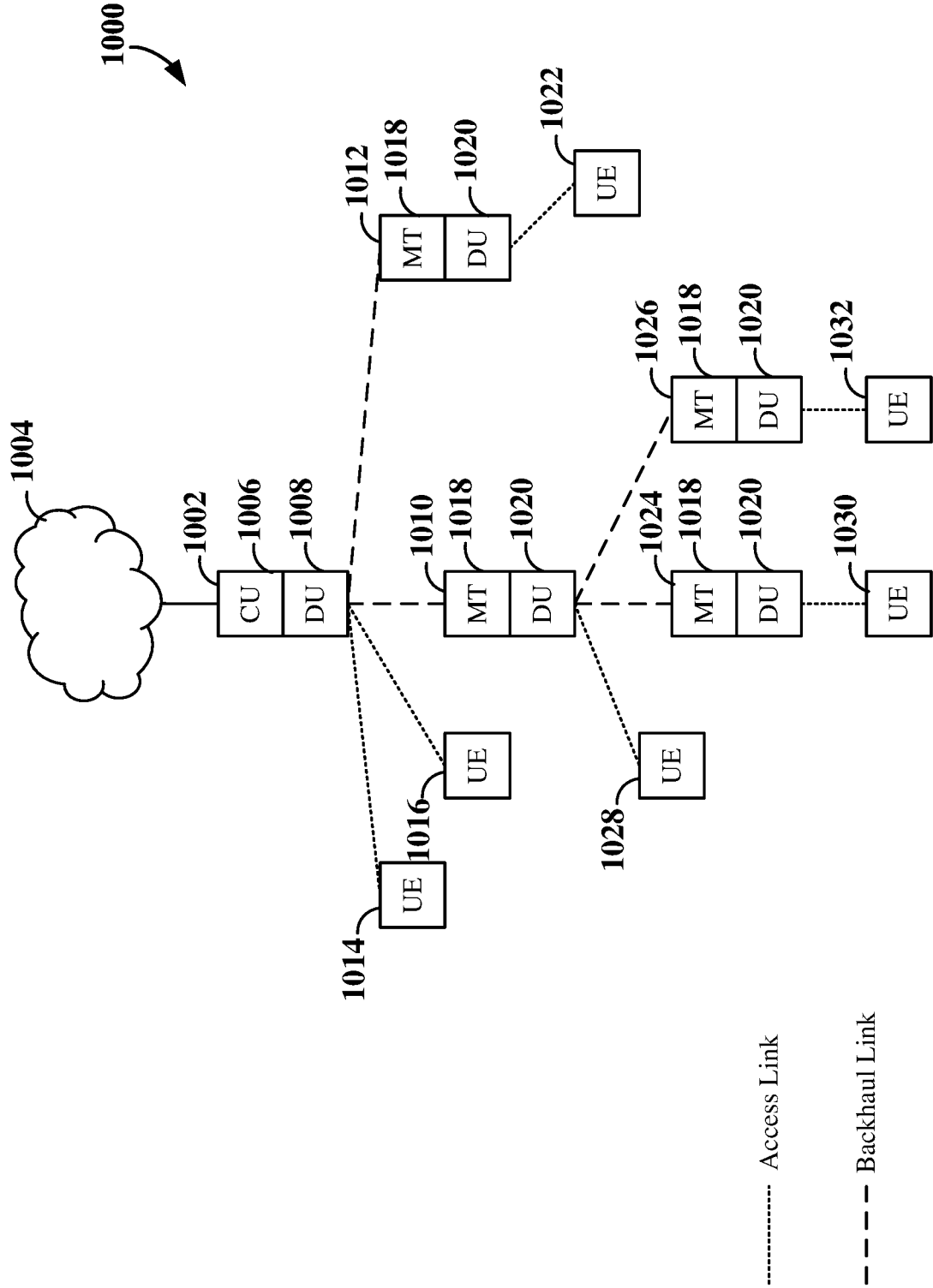
FIG. 10 is a diagram illustrating an example of IAB node functionality within an IAB network according to some aspects.

FIG. 10 is a schematic diagram illustrating an example of IAB node functionality within an IAB network 1000. In the example shown in FIG. 10, an IAB node 1002 is shown coupled to a core network 1004 via a wireline connection. This IAB node 1002 may be referred to herein as an IAB donor node, which may be, for example, an enhanced gNB including functionality for controlling the IAB network 1000. In some examples, the IAB donor node 1002 may include a central unit (CU) 1006 and a distributed unit (DU) 1008. The CU 1006 is configured to operate as a centralized network node (or central entity) within the IAB network 1000. For example, the CU 1006 may include radio resource control (RRC) layer functionality and packet data convergence protocol (PDCP) layer functionality to control/configure the other nodes (e.g., IAB nodes and UEs) within the IAB network 1000. Thus, the CU 1006 can be configured to implement centralized mechanisms for handover decisions, topology changes, routing, bearer mapping, UE security, and other suitable services.

The DU 1008 is configured to operate as a scheduling entity to schedule scheduled entities (e.g., other IAB nodes and UEs) of the IAB donor node 1002. For example, the DU 1008 of the IAB donor node 1002 may operate as a scheduling entity to schedule IAB nodes 1010 and 1012 and UEs 1014 and 1016. Thus, the DU 1008 of the IAB donor node 1002 may schedule communication with IAB nodes 1010 and 1012 via respective backhaul links and schedule communication with UEs 1014 and 1016 via respective access links. In some examples, the DU 1008 may include the radio link control (RLC), medium access control (MAC), and physical (PHY) layer functionality to enable operation as a scheduling entity.

Each of the IAB nodes 1010 and 1012 may be configured as a Layer 2 (L2) relay node including a respective DU 1020 and a mobile termination (MT) unit 1018 to enable each L2 relay IAB node 1010 and 1012 to operate as a scheduling entity and a scheduled entity. For example, the MT unit 1018 within each of the L2 relay IAB nodes 1010 and 1012 is configured to operate as a scheduled entity that may be scheduled by the IAB donor node 1002. Each MT unit 1018 within the L2 relay IAB nodes 1010 and 1012 further facilitates communication with the IAB donor node 1002 via respective backhaul links. In addition, the DU 1020 within each of the L2 relay IAB nodes 1010 and 1012 operates similar to the DU 1008 within the IAB donor node 1002 to function as a scheduling entity to schedule one or more respective scheduled entities (e.g., other IAB nodes and/or UEs) of the L2 relay IAB nodes 1010 and 1012.

For example, the DU 1020 of L2 relay IAB node 1012 functions as a scheduling entity to schedule communication with a UE 1022 via an access link, while the DU 1020 of L2 relay IAB node 1010 functions as a scheduling entity to schedule communication with the MT units 1018 of L2 relay IAB nodes 1024 and 1026 via respective backhaul links and a UE 1028 via an access link. Each of the L2 relay IAB nodes 1024 and 1026 further includes a respective DU 1020 that functions as a scheduling entity to communicate with respective UEs 1030 and 1032.

Thus, in the network topology illustrated in FIG. 10, the IAB donor node 1002, in combination with each of the L2 relay IAB nodes 1010, 1012, 1024 and 1026, can collectively form a disaggregated base station. The disaggregated base station includes the CU 1006 and each of the DUs 1008 and 1020 controlled by the CU 1006. The CU/DU functional split in disaggregated base stations can facilitate the realization of time-critical services, such as scheduling, retransmission, segmentation, and other similar services in the DU 1008/1020, while centralizing the less time-critical services in the CU 1006. In addition, the CU/DU separation enables termination of external interfaces in the CU 1006 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network.

Figure 11:
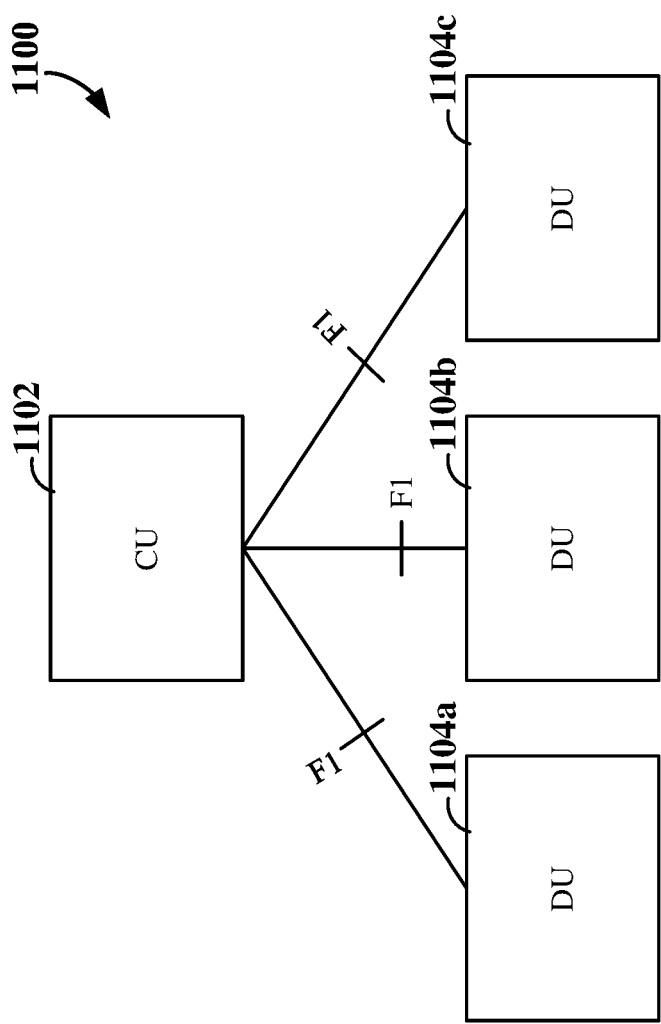
FIG. 11 is a diagram illustrating an example of a disaggregated base station according to some aspects.

FIG. 11 illustrates an example of a disaggregated base station 1100 according to some aspects. The disaggregated base station 1100 includes a CU 1102 and one or more DUs (three of which, 1104a, 1104b, 1104c, are shown for convenience). Each DU 1104a, 1104b, and 1104c supports the PHY, MAC, and RLC layers of the radio protocol stack. The CU 1102 supports the higher layers, such as the PDCP and RRC layers. One of the DUs (e.g., DU 1104a) may be co-located with the CU 1102, while the other DUs 1104b and 1104c may be distributed throughout a network. The CU 1102 and DUs 1104a, 1104b, and 1104c are logically connected via the F1 interface, which utilizes the F1 Application Protocol (F1-AP) for communication of information between the CU 1102 and each of the DUs 1104a, 1104b, and 1104c and for establishing generic tunneling protocol (GTP) tunnels between the DU and CU for each radio bearer.

In some examples, the CU 1102 may be configured to perform operations related to mobility (e.g., handover, dual connectivity, etc.), minimization of drive tests (MDT), and self-organizing networks (SON). A SON refers to mobile network automation and minimization of human intervention in cellular/wireless network management. SON's objectives include: 1) bringing intelligence and autonomous adaptability into cellular networks; 2) reducing capital and operation expenditures; and 3) enhancing network performances in terms of network capacity, coverage, offered service/experience, etc. SON aims at improving spectral efficiency, simplifying management, and reducing the operation costs of next generation radio access networks (RANs).

Drive tests are used for collecting data of mobile networks. This data is needed for the configuration and maintenance of mobile networks, e.g., with respect to network capacity optimization, network coverage optimization, UE mobility optimization, and quality of service (QoS) verification. In order to execute drive tests, human effort is required. However, these measurements cover only a small piece of time and location of the network. MDT enables operators to utilize UEs to collect radio measurements and associated location information, in order to assess network performance while reducing the operation expenditures associated with traditional drive tests. As such, MDT allows for standard UEs to be used for collecting/recording measurements and reporting the measurements to the operators while traditional drive tests make use of high developed measurement equipment.

To facilitate mobility, SON, and MDT operations, the CU 1102 may need to have knowledge of lower layer events and measurements undertaken by the various DUs 1104a, and 1104b, and 1104c. Various aspects of the disclosure provide enhancements to the F1-AP to enable measurement and event reporting from the DUs 1104a, 1104b, and 1104c to the CU 1102. The CU 1102 may configure each of the DUs 1104a, 1104b, and 1104c to obtain values related to measurements or events and transmit measurement reports to the CU 1102 periodically or upon the occurrence of the event. Examples of DU measurements and events that may assist the CU 1102 in mobility, SON, MDT, and other CU-related operations may include RACH reports, uplink (UL) measurements, RLC protocol measurements, MAC protocol measurements, a respective load of each of the DUs 1104a, 1104b, and 1104c, detection of a remote interference measurement (RIM) or strong UL interference measurement by one or more of the DUs 1104a, 1104b, and 1104c, and other suitable measurements or events.

Figure 12:
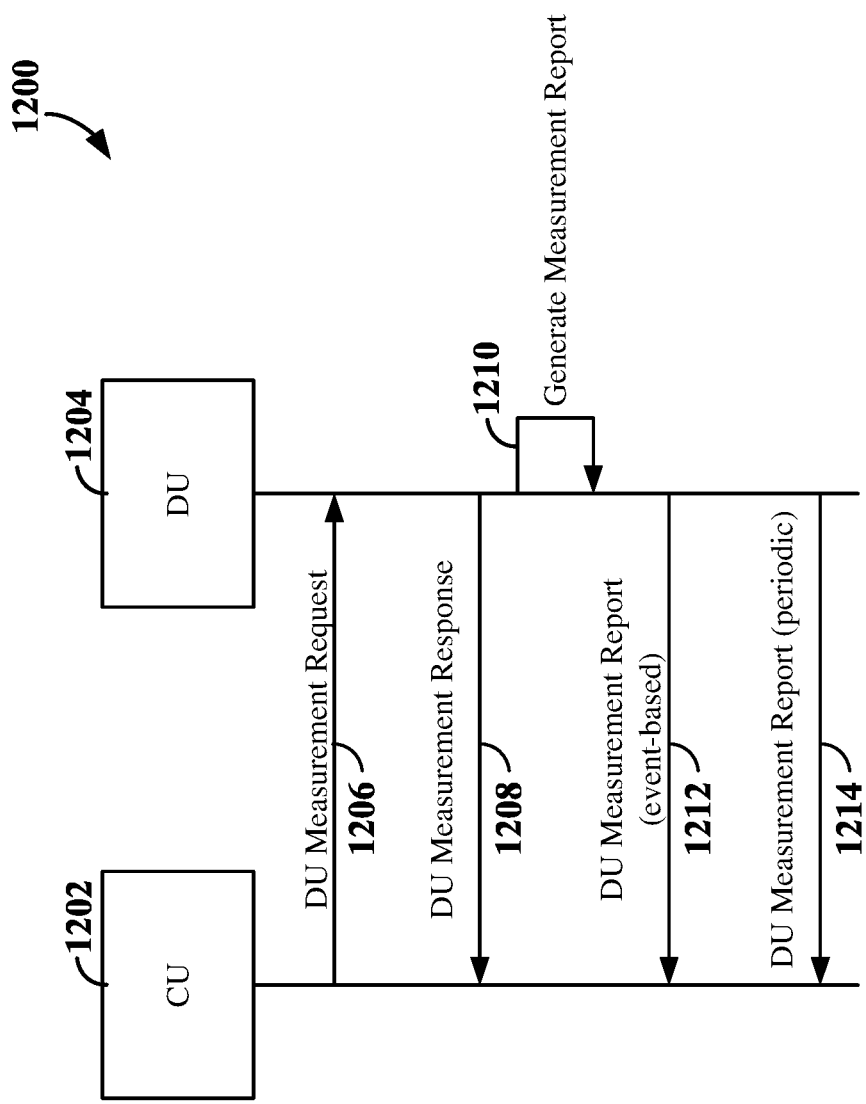
FIG. 12 is a diagram illustrating exemplary signaling between a CU and a DU of a disaggregated base station to commence DU measurement configuration and reporting according to some aspects.

FIG. 12 is a diagram illustrating exemplary signaling between a CU 1202 and a DU 1204 of a disaggregated base station 1200 to commence DU measurement configuration and reporting. The signaling between the CU 1202 and the DU 1204 may traverse the F1 interface. The CU 1202 may correspond, for example, to the CU 1006 within the IAB donor node 1002 of FIG. 10 or CU 1102 shown in FIG. 11. The DU 1204 may correspond, for example, to any of the DUs illustrated in FIGS. 10 and/or 11.

In the example shown in FIG. 12, at 1206, the CU 1202 may send a measurement request to the DU 1204 via the F1 interface. The measurement request may include a measurement configuration associated with at least one value related to a measurement or event to be obtained by the DU 1204. The measurement request may further include a reporting configuration for reporting the at least one value to the CU 1202. At 1208, the DU 1204 may send a measurement response to the CU 1202 confirming configuration of the DU 1204 in accordance with the measurement configuration and the reporting configuration.

At 1210, the DU 1204 may obtain the at least one value in accordance with the measurement configuration and generate a measurement report including the at least one value in accordance with the reporting configuration. In some examples, the at least one value may include a RACH report, an uplink (UL) measurement, an RLC protocol measurement, a MAC protocol measurement, the DU load, a RIM detected indicator, a strong UL interference measurement detected indicator, or other values corresponding to other suitable measurements or events.

In some examples, the reporting configuration may configure the DU 1204 for periodic reporting or event-based reporting of the measurement report. Therefore, at 1212 and 1214, the DU 1204 may send either an event-based DU measurement report or a periodic DU measurement report.

Figure 13:
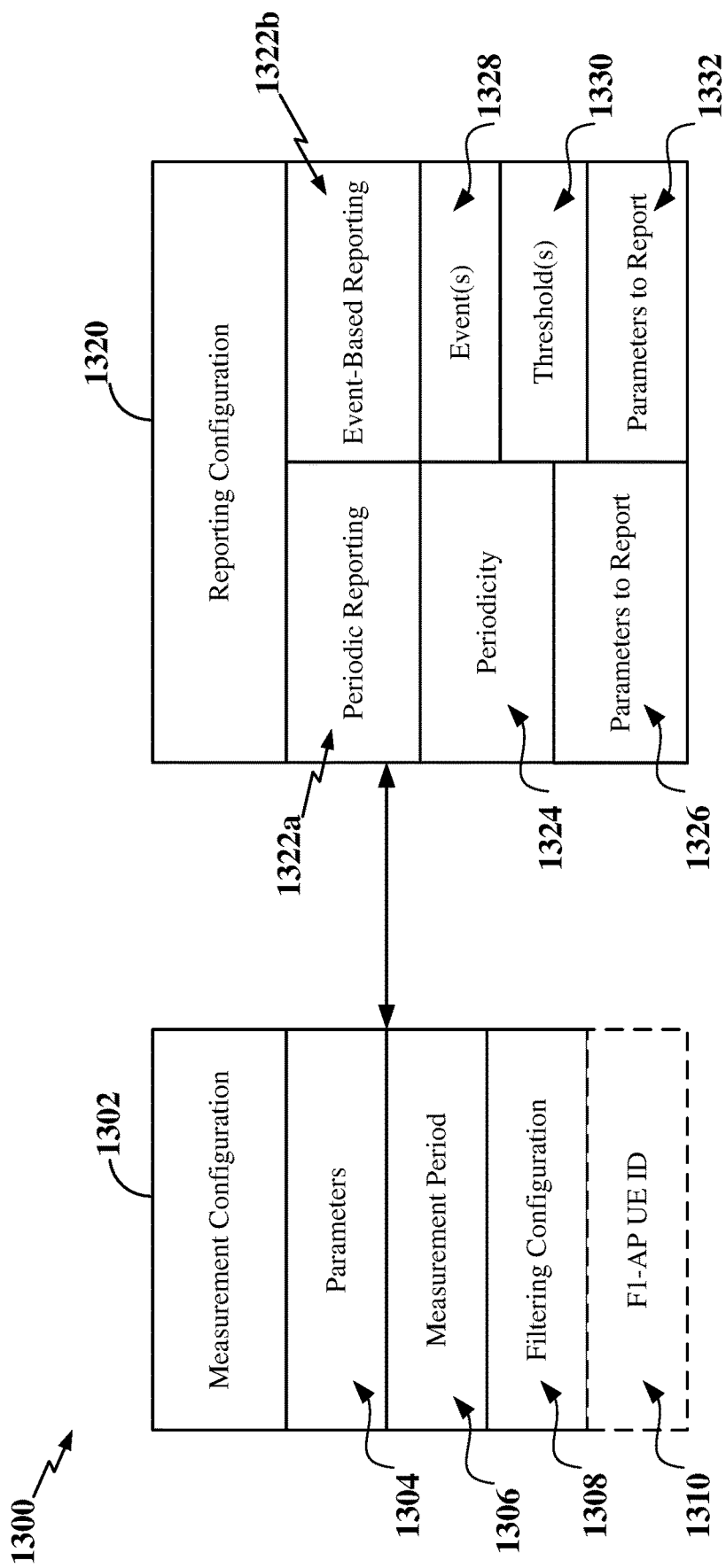
FIG. 13 is a diagram illustrating an example of a measurement request for configuring measurement and event reporting by a DU according to some aspects.

FIG. 13 is a diagram illustrating an example of a measurement request 1300 for configuring measurement and event reporting by a DU according to some aspects. The measurement request 1300 includes a measurement configuration 1302 and a reporting configuration 1320 for the measurement configuration 1302. The measurement configuration 1302 may include at least one parameter 1304 associated with at least one value to be reported by the DU. In addition, the measurement configuration 1302 may include a measurement period 1306 over which the at least one value is obtained by the DU. The measurement period may include, for example, a measurement window or other period of time over which the at least one value (e.g., a measurement) may be obtained.

The measurement configuration 1302 may further include a filtering configuration 1308 for filtering the at least one value. In some examples, lower layer measurements may fluctuate at a high rate, and therefore, the filtering configuration may indicate a filter to be used by the DU to reduce the fluctuation in the measurement. The measurement configuration 1302 may further include an optional F1-AP UE ID field 1310. When the F1-AP UE ID field 1310 is included in the measurement configuration 1302, an identifier of a UE (UE ID) associated with the measurement configuration 1302 is included in the F1-AP UE ID field 1310. In this example, the measurement configuration is UE-specific (e.g., an F1-AP UE-associated service). As such, the measurement report should contain a UE-specific value (e.g., a value associated with or obtained by the UE), along with the UE ID. Otherwise, the measurement configuration 1302 is cell/DU specific.

The reporting configuration 1320 may configure the DU with periodic reporting 1322a or event-based reporting 1322b associated with the measurement configuration 1302. When the reporting configuration 1320 is a periodic reporting configuration 1322a, the reporting configuration 1320 may include a periodicity 1324 of transmission of the measurement report. For example, the periodicity 1324 of the reporting configuration 1320 may instruct the DU to generate and transmit the measurement report for the measurement configuration 1302 at predefined intervals of time. The periodic reporting configuration 1322a may further indicate one or more selected parameters 1326 of the measurement configuration parameters 1304 to include in the measurement report. The selected parameters 1326 may include all of the measurement configuration parameters 1304 or a subset of the measurement configuration parameters 1304.

When the reporting configuration 1320 is an event-based reporting configuration 1322b, the reporting configuration 1320 may include an event-based indicator 1328 that provides an indication of an event triggering the measurement report. For example, the event-based indicator 1328 may request the DU to generate and transmit the measurement report upon the occurrence of the event corresponding to the measurement configuration 1302. The event-based reporting configuration 1322b may further include one or more threshold(s) 1330 that may be used by the DU to determine whether to send the measurement report. For example, a threshold 1330 may indicate a certain number of occurrences of the event before the UE generates and sends the measurement report. The event-based reporting configuration 1322b may further indicate one or more selected parameters 1332 of the measurement configuration parameters 1304 to include in the measurement report. The selected parameters 1332 may include all of the measurement configuration parameters 1304 or a subset of the measurement configuration parameters 1304.

In some examples, the at least one value includes a RACH report, and the measurement configuration 1302 configures the DU to send the RACH report. In addition, the reporting configuration 1320 may be an event-based reporting configuration 1322b that configures the DU to send the RACH report upon completion of a successful RACH procedure performed by a UE. For initial access and some other scenarios, the CU may have knowledge of the RACH procedure and request the UE to transmit the RACH report to the CU via RRC signaling. In these scenarios, the RACH report may be sent without requiring CU configuration of the DU. However, in other scenarios, such as loss of UL synchronization, no PUCCH resources, scheduling request failure, etc., the CU may not have knowledge of the RACH procedure, and as such, the CU may configure the DU to transmit the RACH report using the measurement configuration 1302 and associated reporting configuration 1320/1322b.

For RACH reports, the at least one parameter 1304 included in the measurement configuration 1302 may include one or more RACH parameters. For example, the RACH parameters 1304 may include one or more of a RACH indicator that indicates the report is a RACH report, a timing advance value provided to the UE during the RACH procedure, a detected power (e.g., RSRP or RSRQ of msg2 or msgB measured by the UE during the RACH procedure), a RACH trigger indicating a reason (scenario) for initiating the RACH procedure (if DU known), a beam ID or SSB ID corresponding to a beam used for the RACH procedure, an uplink frequency band (e.g., SUL or normal UL) used in the RACH procedure, a PRACH resource used for msg1/msgA in the RACH procedure, a RACH type (e.g., 2-step, 4-step, CFRA, CBRA, etc.), and a RAR window size of a RAR window configured for msgB of the RACH procedure (e.g., for optimization of the RAR window by the CU to reduce latency).

Based on the reporting configuration 1320, the CU may configure the DU to generate a RACH report including respective values for each of the RACH parameters 1304 provided in the measurement configuration 1302 or a subset of the RACH parameters 1304 provided in the measurement configuration 1302, as indicated by the selected parameters 1332 in the reporting configuration 1320/1322b. In this example, the reporting configuration 1320 may not include a threshold 1330 and the measurement configuration 1302 may not include a measurement period 1306 or filtering configuration 1308 (e.g., these fields may be set to a null value).

In some examples, the at least one value includes an uplink measurement, and the measurement configuration 1302 configures the DU to send the uplink measurement. In addition, the reporting configuration 1320 may be a periodic reporting configuration 1322a or an event-based reporting configuration 1322b that configures the DU to send the measurement report either periodically or upon the occurrence of an event. In this example, the at least one parameter 1304 included in the measurement configuration 1302 includes at least one uplink measurement parameter. For example, the uplink measurement parameters 1304 may include at least one of a sounding reference signal (SRS) measurement, a phase tracking reference signal (PTRS) measurement, an angle of arrival (AOA) measurement, an interference over thermal (IoT) measurement, a hybrid automatic repeat request (HARQ) retransmission rate, a maximum number of HARQ retransmissions reached indicator, or a beam measurement report (e.g., RSRP/RSRQ/SINR per beam, as measured and reported by a UE).

In examples in which the uplink measurement parameter(s) 1304 include one or more of an SRS measurement, a PTRS measurement, an AOA measurement, an IOT measurement, or a HARQ retransmission rate, the measurement configuration 1302 may include a measurement period 1306. The reporting configuration 1320 may further include a periodic reporting configuration 1322a indicating a periodicity 1324 and selected parameters 1326 of the uplink measurement parameters 1304 to include in the measurement report. In addition, for SRS measurements, PTRS measurements, AOA measurements, and IOT measurements, the measurement configuration 1302 may further include a respective filtering configuration 1308 for one or more of the uplink measurement parameters 1304. In other examples, the reporting configuration 1320 may include an event-based reporting configuration 1322b instructing the DU to send the measurement report when the uplink measurement parameter 1304 exceeds a threshold 1330.

In examples in which the uplink measurement parameter(s) 1304 include the maximum number of HARQ retransmissions reached indicator or a beam measurement report, the reporting configuration 1320 may be an event-based reporting configuration 1322b that instructs the DU to transmit the measurement report upon determining that the maximum number of HARQ retransmissions for a UE has been reached or upon receiving a beam measurement report from a UE.

In some examples, the at least one value includes an RLC measurement and the measurement configuration 1302 configures the DU to send the RLC measurement. In addition, the reporting configuration 1320 may be a periodic reporting configuration 1322a or an event-based reporting configuration 1322b that configures the DU to send the measurement report either periodically or upon the occurrence of an event. For example, the RLC measurement parameter(s) 1304 may include at least one of a downlink RLC buffer occupancy, a first average number of RLC retransmissions per data radio bearer (DRB), a second average number of RLC retransmissions per user equipment (UE), a third average number of RLC retransmissions per cell, or a maximum number of RLC retransmissions detected indicator.

In examples in which the RLC measurement parameter(s) 1304 include one or more of an RLC buffer occupancy or average number of RLC transmissions per DRB/cell/UE, the measurement configuration 1302 may include a measurement period 1306. The reporting configuration 1320 may further include a periodic reporting configuration 1322a indicating a periodicity 1324 and selected parameters 1326 of the RLC measurement parameters 1304 to include in the measurement report. In other examples, the reporting configuration 1320 can include an event-based reporting configuration 1322b instructing the DU to send the measurement report when the RLC measurement exceeds a threshold 1330. In examples in which the RLC measurement parameter(s) 1304 include the maximum number of RLC retransmissions detected indicator, the reporting configuration 1320 may be an event-based reporting configuration 1322b that instructs the DU to transmit the measurement report upon determining that the maximum number of RLC retransmissions for a UE has been detected. In some examples, the maximum number of RLC retransmissions detected may be indicated to the CU in a radio link failure (RLF) report without requiring CU configuration of the DU.

In some examples, the at least one value includes a MAC measurement and the measurement configuration 1302 configures the DU to send the MAC measurement. For example, the MAC measurement parameter(s) 1304 may include a beam failure recovery statistic. In this example, the reporting configuration 1320 may be a periodic reporting configuration 1322a or an event-based reporting configuration 1322b that configures the DU to send the measurement report either periodically or upon the occurrence of an event (e.g., the BFM statistic reaching a threshold 1330).

In some examples, the at least one value includes a load of the DU and the measurement configuration 1302 configures the DU to send the DU load. Here, the measurement parameter 1304 is the DU load, which may have an associated measurement period 1306. In this example, the reporting configuration 1320 may be a periodic reporting configuration 1322a or an event-based reporting configuration 1322b that configures the DU to send the measurement report either periodically or upon the occurrence of an event (e.g., the DU load reaching a threshold 1330).

In some examples, the at least one value includes an interference indicator and the measurement configuration 1302 configures the DU to send the interference indicator. For example, the measurement parameter 1304 may include a remote interference detected indicator or a strong uplink interference detected indicator. In this example, the reporting configuration 1320 may be an event-based reporting configuration 1322b that configures the DU to send the measurement report upon detecting remote interference or strong uplink interference.

Figure 14:
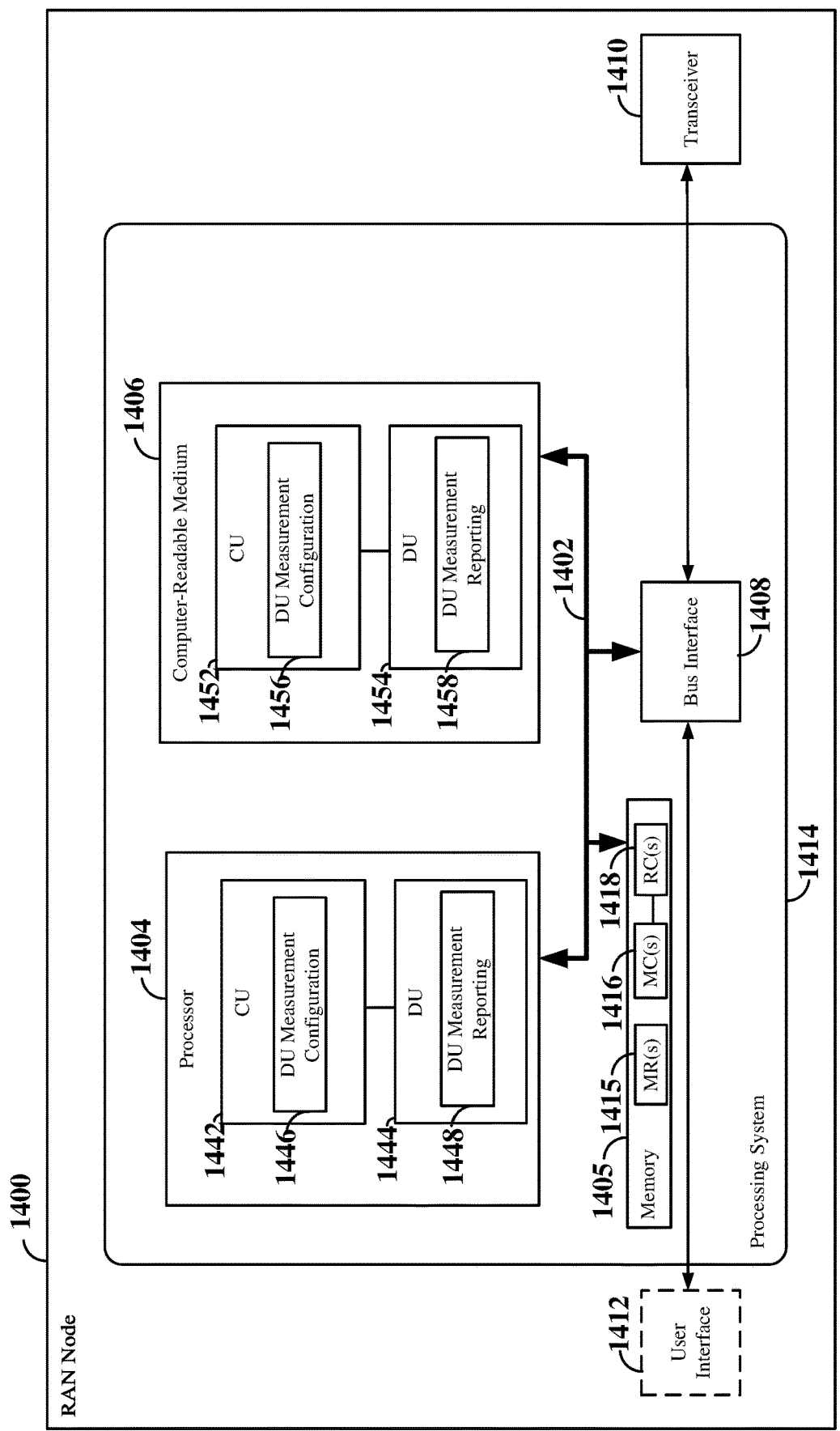
FIG. 14 is a block diagram illustrating an example of a hardware implementation for an IAB node forming at least a part of a disaggregated base station employing a processing system according to some aspects.

FIG. 14 is a block diagram illustrating an example of a hardware implementation for a radio access network (RAN) node 1400 employing a processing system 1414. For example, the RAN node 1400 may be an IAB donor node, L2 relay IAB node, or other RAN node (e.g., base station, such as a gNB) forming at least a part of a disaggregated base station, as illustrated in any one or more of FIGS. 9-12.

The RAN node 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1400 may be configured to perform any one or more of the functions described herein. That is, the processor 1404, as utilized in a RAN node 1400, may be used to implement any one or more of the processes and procedures described below.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium (e.g., air). Depending upon the nature of the apparatus, a user interface 1412 (e.g., keypad, display, speaker, microphone, joystick, touchscreen) may also be provided. Of course, such a user interface 1412 is optional, and may be omitted in some examples.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. In examples in which the RAN node 1400 is an IAB donor node, the processor 1404 may include central unit (CU) circuitry 1442 and distributed unit (DU) circuitry 1444. In examples in which the RAN node 1400 is an L2 relay IAB node, the processor 1404 may only include the DU circuitry 1444 (e.g., the CU circuitry 1442 is omitted in this example). The CU circuitry 1442 may further be configured to execute CU software 1452 included on the computer-readable medium 1406 to implement one or more of the functions described herein. In addition, the DU circuitry 1444 may further be configured to execute DU software 1454 included on the computer-readable medium 1406 to implement one or more of the functions described herein.

The CU circuitry 1442 may further include DU measurement configuration circuitry 1446, configured to configure the DU circuitry 1444 to obtain values related to measurements or events and transmit measurement reports (MRs) 1415 to the CU circuitry 1442 periodically or upon the occurrence of the event. Examples of values that may be included in DU measurement reports 1415 may include RACH reports, uplink (UL) measurements, RLC protocol measurements, MAC protocol measurements, the DU load, RIM detection, strong UL interference detection, and other suitable values related to measurements or events. The DU measurement configuration circuitry 1446 may further be configured to configure other DUs controlled by the CU circuitry 1442 in other L2 relay IAB nodes via the transceiver 1410.

In some examples, the DU measurement configuration circuitry 1446 may configure the DU circuitry 1444 and other DUs by sending a measurement request to the DU circuitry 1444 (and other DUs) via a logical F1 interface. The measurement request may include a measurement configuration 1416 associated with at least one value related to a measurement or event to be obtained by the DU circuitry 1444. The measurement request may further include a reporting configuration 1418 for use by the DU circuitry 1444 in generating and sending a measurement report 1415 reporting the at least one value to the CU circuitry 1442. The DU measurement configuration circuitry 1446 may configure the DU circuitry 1444 (and other DUs) with multiple measurement configurations 1416 and associated reporting configurations 1418, each associated with a different measurement report, which may be UE-specific or DU/cell-specific. The DU measurement configuration circuitry 1446 may further be configured to execute DU measurement configuration software 1456 included on the computer-readable medium 1406 to implement one or more of the functions described herein.

In some examples, the DU circuitry 1444 may include DU measurement reporting circuitry 1448, configured to receive the measurement request from the DU measurement configuration circuitry 1446 (or external DU measurement configuration circuitry when the RAN node 1400 is an L2 relay IAB node). The DU measurement reporting circuitry 1448 may further be configured to send a measurement response to the DU measurement configuration circuitry 1446 confirming configuration of the DU measurement reporting circuitry 1448 in accordance with the measurement configuration 1416 and the reporting configuration 1418.

The DU measurement reporting circuitry 1448 may further be configured to obtain the at least one value in accordance with the measurement configuration 1416 and generate a measurement report 1415 including the at least one value in accordance with the reporting configuration 1418. In some examples, the at least one value may include a RACH report, an uplink (UL) measurement, an RLC protocol measurement, a MAC protocol measurement, the DU load, a RIM detected indicator, or a strong UL interference measurement detected indicator. In some examples, the reporting configuration 1418 may configure the DU measurement reporting circuitry 1448 for periodic reporting or event-based reporting of the measurement report 1415. Therefore, the DU measurement reporting circuitry 1448 may send either an event-based DU measurement report or a periodic DU measurement report 1415 to the CU circuitry 1442. The DU measurement reporting circuitry 1448 may further be configured to execute DU measurement reporting software 1458 included on the computer-readable medium 1406 to implement one or more functions described herein.

Figure 15:
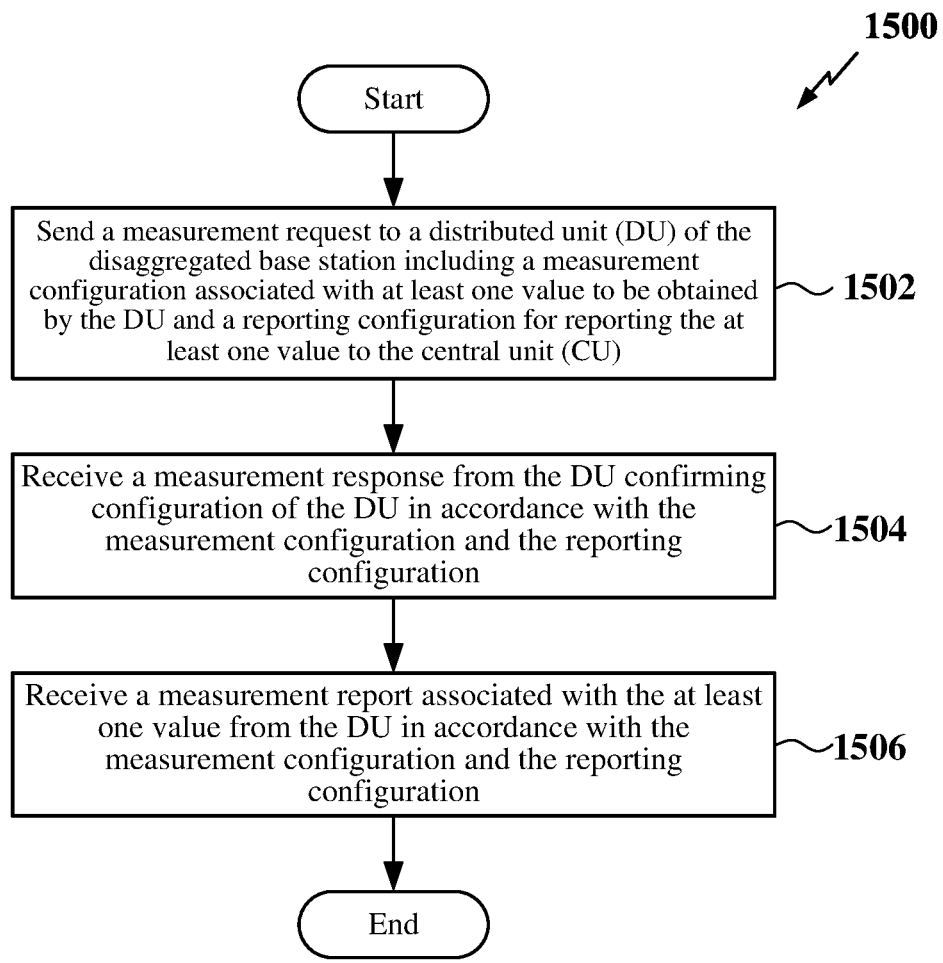
FIG. 15 is a flow chart illustrating an exemplary process for a CU to configure DU measurement and event reporting according to some aspects.

FIG. 15 is a flow chart illustrating an exemplary process 1500 for a CU to configure DU measurement and event reporting according to some aspects. As described below, some or all illustrated features may be omitted in a particular implementation within the scope of the present disclosure, and some illustrated features may not be required for implementation of all embodiments. In some examples, the process 1500 may be carried out by the RAN node illustrated in FIG. 14. The RAN node may include the CU and may further include a DU and/or be in wireless communication with one or more DUs that collectively form a disaggregated base station. In some examples, the process 1500 may be carried out by any suitable apparatus or means for carrying out the functions or algorithm described below.

At block 1502, the CU may send a measurement request to a distributed unit (DU) of the disaggregated base station. The measurement request can include a measurement configuration associated with at least one value to be obtained by the DU and a reporting configuration for reporting the at least one value to the CU.

For example, the at least one value can include a random access channel (RACH) report and the measurement configuration can include at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size. As another example, the at least one value can include an uplink measurement, and the measurement configuration can include at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

As another example, the at least one value can include a radio link protocol (RLC) measurement, and the measurement configuration can include at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator. As another example, the at least one value can include a medium access control (MAC) protocol measurement, and the measurement configuration can include at least a beam failure recovery statistic.

In some examples, the measurement configuration includes at least one parameter associated with the at least one value. In this example, the reporting configuration may indicate at least one selected parameter of the at least one parameter to include in the measurement report. In some examples, the at least one value includes a load of the DU, a remote interference detected indicator, or a strong uplink interference detected indicator.

In some examples, the measurement configuration may further include at least one of a measurement period for the at least one value or a filtering configuration for filtering the at least one value. In some examples, the measurement configuration may further include an identifier of a user equipment (UE) associated with the at least one value.

In some examples, the reporting configuration may be a periodic reporting configuration including a periodicity of the measurement report, along with one or more selected parameters of the measurement configuration parameters to include in the measurement report. In some examples, the reporting configuration may be an event-based reporting configuration including an event-based indicator requesting the DU to send the measurement report upon an occurrence of an event corresponding to the measurement configuration. The event-reporting configuration may further include one or more selected parameters of the measurement configuration parameters to include in the measurement report. In some examples, the event-reporting configuration may further include at least one threshold associated with the event. For example, the DU measurement configuration circuitry 1446 shown and described above in connection with FIG. 14 may send the measurement request to the DU via the F1 interface.

At block 1504, the CU may receive a measurement response from the DU confirming configuration of the DU in accordance with the measurement configuration and the reporting configuration. For example, the DU measurement configuration circuitry 1446 shown and described above in connection with FIG. 14 may receive the measurement response from the DU via the F1 interface.

At block 1506, the CU may receive a measurement report associated with the at least one value from the DU in accordance with the measurement configuration and the reporting configuration. In some examples, the measurement report includes the at least one value. In addition, the measurement report may further include an identifier of a UE when the measurement configuration indicates that the measurement report is UE-specific (e.g., the measurement configuration includes the identifier of the UE associated with the at least one value). Here, the UE may be served by the disaggregated base station. For example, the CU circuitry 1442 shown and described above in connection with FIG. 14 may receive the measurement report.

Figure 16:
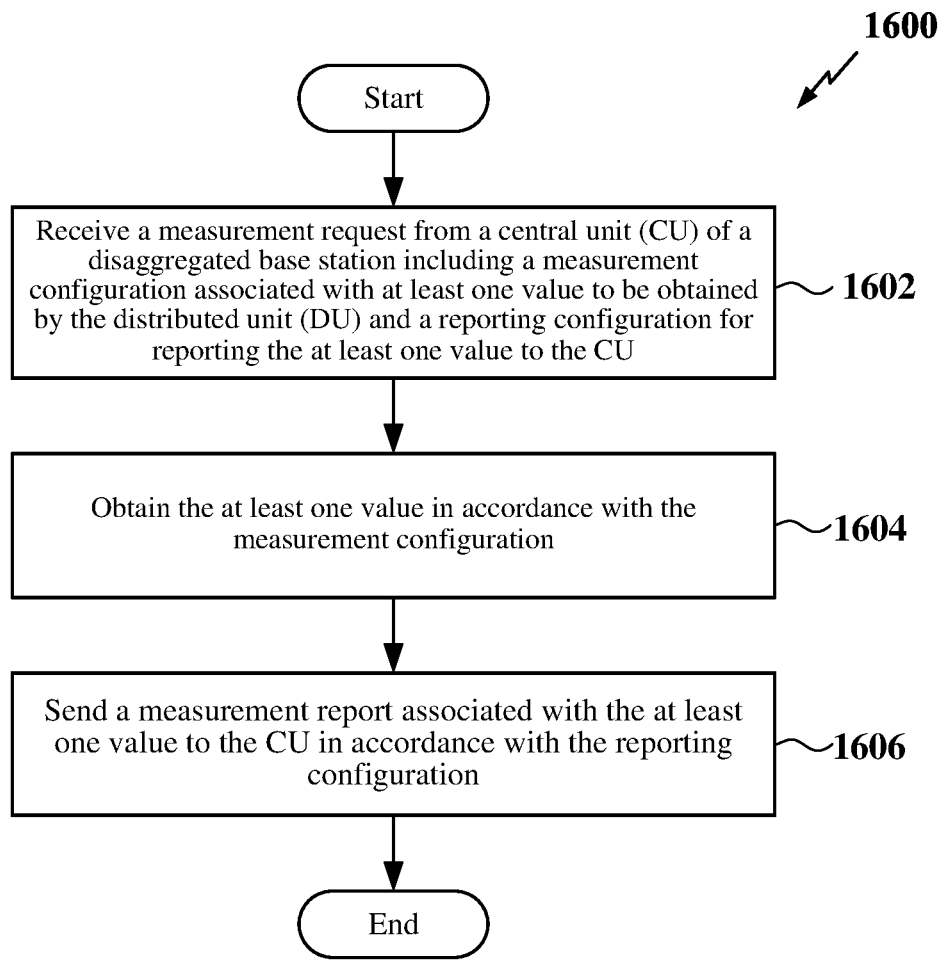
FIG. 16 is a flow chart illustrating an exemplary process for DU measurement and event reporting in accordance with a CU configuration according to some aspects.

FIG. 16 is a flow chart illustrating an exemplary process 1600 for DU measurement and event reporting according to some aspects. As described below, some or all illustrated features may be omitted in a particular implementation within the scope of the present disclosure, and some illustrated features may not be required for implementation of all embodiments. In some examples, the process 1600 may be carried out by the RAN node illustrated in FIG. 14. The RAN node may include the DU and further include a CU or be in wireless communication with a CU that, together with the DU, forms a disaggregated base station. In some examples, the process 1600 may be carried out by any suitable apparatus or means for carrying out the functions or algorithm described below.

At block 1602, the DU may receive a measurement request from a central unit (CU) of the disaggregated base station. The measurement request can include a measurement configuration associated with at least one value to be obtained by the DU and a reporting configuration for reporting the at least one value to the CU.

In some examples, the at least one value can include a random access channel (RACH) report and the measurement configuration can include at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size. As another example, the at least one value can include an uplink measurement, and the measurement configuration can include at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

As another example, the at least one value can include a radio link protocol (RLC) measurement, and the measurement configuration can include at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator. As another example, the at least one value can include a medium access control (MAC) protocol measurement, and the measurement configuration can include at least a beam failure recovery statistic.

In some examples, the measurement configuration includes at least one parameter associated with the at least one value. In this example, the reporting configuration may indicate at least one selected parameter of the at least one parameter to include in the measurement report. In some examples, the at least one value includes a load of the DU, a remote interference detected indicator, or a strong uplink interference detected indicator.

In some examples, the measurement configuration may further include at least one of a measurement period for the at least one value or a filtering configuration for filtering the at least one value. In some examples, the measurement configuration may further include an identifier of a user equipment (UE) associated with the at least one value.

In some examples, the reporting configuration may be a periodic reporting configuration including a periodicity of the measurement report, along with one or more selected parameters of the measurement configuration parameters to include in the measurement report. In some examples, the reporting configuration may be an event-based reporting configuration including an event-based indicator requesting the DU to send the measurement report upon an occurrence of an event corresponding to the measurement configuration. The event-reporting configuration may further include one or more selected parameters of the measurement configuration parameters to include in the measurement report. In some examples, the event-reporting configuration may further include at least one threshold associated with the event. For example, the DU measurement reporting circuitry 1448 shown and described above in connection with FIG. 14 may receive the measurement request from the CU via the F1 interface.

At block 1604, the DU may obtain the at least one value in accordance with the measurement configuration. For example, the DU measurement reporting circuitry 1448 shown and described above in connection with FIG. 14 may obtain the least one value.

At block 1606, the DU may send a measurement report associated with the at least one value to the CU in accordance with the reporting configuration. In some examples, the measurement report includes the at least one value. In addition, the measurement report may further include an identifier of a UE when the measurement configuration indicates that the measurement report is UE-specific (e.g., the measurement configuration includes the identifier of the UE associated with the at least one value). Here, the UE may be served by the disaggregated base station. For example, the DU measurement reporting circuitry 1448 shown and described above in connection with FIG. 14 may send the measurement report.

In one configuration, the disaggregated base station (e.g., DU and/or CU of the disaggregated base station) includes various means as described in the present disclosure. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one of the FIGS. 1, 2, 4-7, 9-12, and/or 14, and utilizing, for example, the processes and/or algorithms described herein in relation to FIGS. 15 and 16.

The processes shown in FIGS. 15 and 16 may include additional aspects, such as any single aspect or any combination of aspects described below and/or in connection with one or more other processes described elsewhere herein.

Aspect 1: A method of operation at a distributed unit (DU) of a disaggregated base station, comprising: receiving a measurement request from a central unit (CU) of the disaggregated base station, the measurement request comprising a measurement configuration associated with at least one value to be obtained by the DU and a reporting configuration for reporting the at least one value to the CU; obtaining the at least one value in accordance with the measurement configuration at the DU; and sending a measurement report associated with the at least one value from the DU to the CU in accordance with the reporting configuration.

Aspect 2: The method of aspect 1, wherein the at least one value comprises a random access channel (RACH) report and the measurement configuration comprises at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size.

Aspect 3: The method of aspect 1, wherein the at least one value comprises an uplink measurement, and the measurement configuration comprises at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

Aspect 4: The method of aspect 1, wherein the at least one value comprises a radio link protocol (RLC) measurement, and the measurement configuration comprises at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator.

Aspect 5: The method of aspect 1, wherein the at least one value comprises a medium access control (MAC) protocol measurement, and wherein the measurement configuration comprises at least a beam failure recovery statistic.

Aspect 6: The method of any of aspects 1 through 5, wherein the measurement configuration comprises at least one parameter associated with the at least one value and the reporting configuration further indicates at least one selected parameter of at least one parameter to include in the measurement report.

Aspect 7: The method of aspect 1 or 6, wherein the at least one value comprises at least one of a load of the DU, a remote interference detected indicator, or a strong uplink interference detected indicator.

Aspect 8: The method of any of aspects 1 through 7, wherein the measurement configuration further comprises at least one of a measurement period for the at least one value or a filtering configuration for filtering the at least one value.

Aspect 9: The method of any of aspects 1 through 8, wherein the reporting configuration comprises at least one of a periodicity of the measurement report or an event-based indicator requesting the DU to send the measurement report upon an occurrence of an event corresponding to the measurement configuration.

Aspect 10: A method of operation at a central unit (CU) of a disaggregated base station, comprising: sending a measurement request to a distributed unit (DU) of the disaggregated base station, the measurement request comprising a measurement configuration associated with at least one value to be obtained by the DU and a reporting configuration for reporting the at least one value to the CU; receiving a measurement response from the DU confirming configuration of the DU in accordance with the measurement configuration and the reporting configuration; and receiving a measurement report associated with the at least one value from the DU in accordance with the measurement configuration and the reporting configuration.

Aspect 11: The method of aspect 10, wherein the at least one value comprises a random access channel (RACH) report and the measurement configuration comprises at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size.

Aspect 12: The method of aspect 10, wherein the at least one value comprises an uplink measurement and the measurement configuration comprises at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

Aspect 13: The method of aspect 10, wherein the at least one value comprises a radio link protocol (RLC) measurement and the measurement configuration comprises at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator.

Aspect 14: The method of aspect 10, wherein the at least one value comprises a medium access control (MAC) protocol measurement and the measurement configuration comprises at least a beam failure recovery statistic.

Aspect 15: The method of any of aspects 10 through 14, wherein the measurement configuration comprises at least one parameter associated with the at least one value and the reporting configuration further indicates at least one selected parameter of the at least one parameter to include in the measurement report.

Aspect 16: The method of aspect 10 or 15, wherein the at least one value comprises at least one of a load of the DU, a remote interference detected indicator, or a strong uplink interference detected indicator.

Aspect 17: The method of any of aspects 10 through 16, wherein the measurement configuration further comprises at least one of a measurement period for the at least one value or a filtering configuration for filtering the at least one value.

Aspect 18: The method of any of aspects 10 through 17, wherein the reporting configuration comprises at least one of a periodicity of the measurement report or an event-based indicator requesting the DU to send the measurement report upon an occurrence of an event corresponding to the measurement configuration.

Aspect 19: The method of any of aspects 10 through 18, wherein the measurement configuration comprises an identifier of a user equipment (UE) associated with the at least one value, wherein the UE is served by the disaggregated base station.

Aspect 20: The method of aspect 19, wherein the measurement report comprises the identifier of the UE.

Aspect 21: An apparatus configured for wireless communication comprising a transceiver, a memory, and a processor coupled to the transceiver and the memory, the processor and the memory configured to perform a method of any one of aspects 1 through 9 or aspects 10 through 20.

Aspect 22: An apparatus in a wireless communication network comprising at least one means for performing a method of any one of aspects 1 through 9 or aspects 10 through 20.

Aspect 23: A non-transitory computer-readable medium storing computer-executable code, comprising code for causing an apparatus in a wireless communication network to perform a method of any one of aspects 1 through 9 or aspects 10 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-7, 9-12, and 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of operation at a distributed unit (DU) of a disaggregated base station, comprising:
    receiving a measurement request from a central unit (CU) of the disaggregated base station, the measurement request comprising a measurement configuration associated with at least one value to be obtained by the DU and a reporting configuration for reporting the at least one value to the CU, wherein the measurement configuration further comprises a radio measurement statistic associated with the at least one value to be reported by the DU, wherein the measurement report comprises a random access channel (RACH) report and the at least one value comprises at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size;
    obtaining the at least one value in accordance with the measurement configuration at the DU; and
    sending a measurement report comprising the at least one value and the radio measurement statistic from the DU to the CU in accordance with the reporting configuration, wherein each measurement report comprising the RACH report is sent upon completion of a successful RACH procedure performed by a user equipment (UE).

2. The method of claim 1, wherein the at least one value further comprises an uplink measurement, the uplink measurement comprising at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

3. The method of claim 1, wherein the at least one value further comprises a radio link protocol (RLC) measurement, the RLC measurement comprising at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator.

4. The method of claim 1, wherein the at least one value further comprises a medium access control (MAC) protocol measurement and the radio measurement statistic comprises at least a beam failure recovery statistic.

5. The method of claim 1, wherein the measurement configuration further comprises at least one parameter associated with the at least one value to be reported by the DU and the reporting configuration further indicates at least one selected parameter of the at least one parameter to include in the measurement report.

6. The method of claim 1, wherein the at least one value further comprises at least one of a load of the DU, a remote interference detected indicator, or a strong uplink interference detected indicator.

7. The method of claim 1, wherein the measurement configuration further comprises a filtering configuration for obtaining the at least one value.

8. The method of claim 1, wherein the reporting configuration comprises at least one of a periodicity of the measurement report or an event-based indicator requesting the DU to send the measurement report upon an occurrence of an event corresponding to the measurement configuration.

9. A disaggregated base station within a wireless communication network, comprising:
    a memory; and
    a processor coupled to the memory, the processor being configured to:
        receive a measurement request from a central unit (CU) of the disaggregated base station, the measurement request comprising a measurement configuration of at least one value to be obtained by the distributed unit (DU) of the disaggregated base station and a reporting configuration for reporting the at least one value to the CU, wherein the measurement configuration further comprises a radio measurement statistic associated with the at least one value to be reported by the DU, wherein the measurement report comprises a random access channel (RACH) report and the at least one value comprises at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size;
        obtain the at least one value in accordance with the measurement configuration at the DU; and
        send a measurement report comprising the at least one value and the radio measurement statistic from the DU to the CU in accordance with the reporting configuration, wherein each measurement report comprising the RACH report is sent upon completion of a successful RACH procedure performed by a user equipment (UE).

10. The disaggregated base station of claim 9, wherein the at least one value further comprises an uplink measurement, the uplink measurement comprising at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

11. The disaggregated base station of claim 9, wherein the at least one value further comprises a radio link protocol (RLC) measurement, the RLC measurement comprising at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator.

12. The disaggregated base station of claim 9, wherein the at least one value further comprises a medium access control (MAC) protocol measurement and the radio measurement statistic comprises at least a beam failure recovery statistic.

13. The disaggregated base station of claim 9, wherein the measurement configuration further comprises at least one parameter associated with the at least one value to be reported by the DU and the reporting configuration further indicates at least one selected parameter of the at least one parameter to include in the measurement report.

14. The disaggregated base station of claim 9, wherein the at least one value further comprises at least one of a load of the DU, a remote interference detected indicator, or a strong uplink interference detected indicator.

15. The disaggregated base station of claim 9, wherein the measurement configuration further comprises a filtering configuration for obtaining the at least one value.

16. The disaggregated base station of claim 9, wherein the reporting configuration comprises at least one of a periodicity of the measurement report or an event-based indicator requesting the DU to send the measurement report upon an occurrence of an event corresponding to the measurement configuration.

17. A method of operation at a central unit (CU) of a disaggregated base station, comprising:
sending a measurement request to a distributed unit (DU) of the disaggregated base station, the measurement request comprising a measurement configuration associated with at least one value to be obtained by the DU and a reporting configuration for reporting the at least one value to the CU, wherein the measurement configuration further comprises a radio measurement statistic associated with the at least one value to be reported by the DU;
receiving a measurement response from the DU confirming configuration of the DU in accordance with the measurement configuration and the reporting configuration; and
receiving a measurement report comprising the at least one value and the radio measurement statistic from the DU in accordance with the measurement configuration and the reporting configuration, wherein the measurement report comprises a random access channel (RACH) report and the at least one value comprises at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size, and wherein each measurement report comprising the RACH report is received by the CU from the DU upon completion of a successful RACH procedure performed by a user equipment (UE).

18. The method of claim 17, wherein the at least one value further comprises an uplink measurement, the uplink measurement comprises at least one of a sounding reference signal (SRS) measurement, a phase tracking reference signal (PTRS) measurement, an angle of arrival measurement, an interference over thermal (IoT) measurement, a hybrid automatic repeat request (HARQ) retransmission rate, a maximum number of HARQ retransmissions reached indicator, or a beam measurement report.

19. The method of claim 17, wherein the at least one value further comprises a radio link protocol (RLC) measurement, the RLC measurement comprises at least one of a downlink RLC buffer occupancy, a first average number of RLC retransmissions per data radio bearer, a second average number of RLC retransmissions per user equipment (UE), a third average number of RLC retransmissions per cell, or a maximum number of RLC retransmissions detected indicator.

20. The method of claim 17, wherein the at least one value further comprises a medium access control (MAC) protocol measurement and the measurement configuration comprises at least a beam failure recovery statistic.

21. The method of claim 17, wherein the measurement configuration comprises at least one parameter associated with the at least one value to be reported by the DU and the reporting configuration further indicates at least one selected parameter of the at least one parameter to include in the measurement report.

22. The method of claim 17, wherein the at least one value further comprises at least one of a load of the DU, a remote interference detected indicator, or a strong uplink interference detected indicator.

23. The method of claim 17, wherein the measurement configuration further comprises a filtering configuration for obtaining the at least one value.

24. The method of claim 17, wherein the reporting configuration comprises at least one of a periodicity of the measurement report or an event-based indicator requesting the DU to send the measurement report upon an occurrence of an event corresponding to the measurement configuration.

25. The method of claim 17, wherein the measurement configuration further comprises an identifier of a user equipment (UE) associated with the at least one value, wherein the UE is served by the disaggregated base station.

26. The method of claim 25, wherein the measurement report comprises the identifier of the UE.

27. A disaggregated base station within a wireless communication network, comprising:
a memory; and
a processor coupled to the memory, the processor being configured to, at a central unit (CU) of the disaggregated base station:
send a measurement request to a distributed unit (DU) of the disaggregated base station, the measurement request comprising a measurement configuration associated with at least one value to be obtained by the DU and a reporting configuration for reporting the at least one value to the CU, wherein the measurement configuration further comprises a radio measurement statistic associated with the at least one value to be reported by the DU;
receive a measurement response from the DU confirming configuration of the DU in accordance with the measurement configuration and the reporting configuration; and
receive a measurement report comprising the at least one value and the radio measurement statistic from the DU in accordance with the measurement configuration and the reporting configuration, wherein the measurement report comprises a random access channel (RACH) report and the at least one value comprises at least one of a RACH indication, a timing advance, a detected power, a detected signal quality, a RACH trigger, a beam identifier, a synchronization signal block (SSB) identifier, an uplink frequency band, a physical RACH (PRACH) resource, a RACH type, or a random access response (RAR) window size, and wherein each measurement report comprising the RACH report is received by the CU from the DU upon completion of a successful RACH procedure performed by a user equipment (UE).

\* \* \* \* \*